US012632329B1

(12) United States Patent
Cho et al.

(10) Patent No.: US 12,632,329 B1
(45) Date of Patent: May 19, 2026

(54) SYSTEMS AND METHODS FOR ARTIFICIAL INTELLIGENCE-BASED ANALYSIS OF OVER-THE-AIR CLIENT LOGS

(71) Applicant: Harman Becker Automotive Systems, Inc., Novi, MI (US)

(72) Inventors: Hyeonje Cho, San Jose, CA (US); Brian H. Xu, Newark, CA (US); Xiaojian Yang, Troy, MI (US)

(73) Assignee: HARMAN BECKER AUTOMOTIVE SYSTEMS, INC., Novi, MI (US)

( * ) Notice: Subject to any disclaimer, the term of this patent is extended or adjusted under 35 U.S.C. 154(b) by 24 days.

(21) Appl. No.: 19/005,884

(22) Filed: Dec. 30, 2024

(51) Int. Cl.
| | |
|---|---|
| *G06F 11/00* | (2006.01) |
| *G06F 11/07* | (2006.01) |
| *G06F 11/34* | (2006.01) |
| *G06F 16/334* | (2025.01) |
| *G06F 16/335* | (2019.01) |

(52) U.S. Cl.
CPC ........ *G06F 11/079* (2013.01); *G06F 11/3476* (2013.01); *G06F 16/3347* (2019.01); *G06F 16/335* (2019.01); *G06F 2201/80* (2013.01)

(58) Field of Classification Search
CPC .. G06F 11/079; G06F 16/3347; G06F 16/335; G06F 11/3476
See application file for complete search history.

(56) References Cited

U.S. PATENT DOCUMENTS

| | | | | |
|---|---|---|---|---|
| 7,213,176 | B2 * | 5/2007 | Banko ................. | G06F 11/0706 |
| | | | | 714/38.12 |
| 9,552,249 | B1 * | 1/2017 | James ................. | G06F 11/0793 |
| 10,489,234 | B2 * | 11/2019 | Narayanan .......... | G06F 11/0778 |
| 11,494,514 | B1 * | 11/2022 | Amico .................... | G06F 21/73 |
| 11,519,745 | B1 * | 12/2022 | Gataric ................. | G06F 16/29 |
| 11,636,004 | B1 * | 4/2023 | Ni ......................... | G06F 18/214 |
| | | | | 714/37 |
| 12,530,252 | B2 * | 1/2026 | Hosudurg ........... | G06F 11/0793 |
| 12,536,089 | B2 * | 1/2026 | Bao ...................... | G06F 11/3476 |
| 2019/0034256 | A1 * | 1/2019 | Fox .................... | B60W 50/0205 |
| 2022/0206886 | A1 * | 6/2022 | Srivastava ............ | G06F 11/079 |
| 2023/0072123 | A1 * | 3/2023 | Sethu ....................... | G06N 5/02 |

(Continued)

*Primary Examiner* — Jonathan D Gibson
(74) *Attorney, Agent, or Firm* — McCoy Russell LLP

(57) ABSTRACT

A method and system for analyzing over-the-air (OTA) client logs from vehicles includes receiving OTA client log files comprising error logs generated during OTA software updates, preprocessing the log files to generate cleaned log files by removing duplicated log lines and standardizing formats, segmenting the cleaned log files into log chunks, and analyzing the chunks using both rule-based and artificial intelligence (AI) approaches. The AI analysis includes generating vector embeddings for error-related log lines, comparing embeddings with an insignificant error database to filter out insignificant errors, retrieving error context information from a vector database, and generating error summaries using a large language model. The system displays analysis results via a failure analysis engineer (FAE) review interface and updates databases based on FAE feedback. This hybrid approach enables efficient processing of OTA client logs while maintaining accuracy through rule-based filtering and contextual AI analysis.

20 Claims, 10 Drawing Sheets

(56)          References Cited

U.S. PATENT DOCUMENTS

2023/0110616 A1*   4/2023  Mracek ............... B60R 16/0232
                                                              701/29.1
2023/0343146 A1*  10/2023  Jung ..................... G07C 5/008
2023/0418587 A1*  12/2023  Yamada ................. G07C 5/008
2024/0089275 A1*   3/2024  An ...................... H04L 63/1425
2025/0284582 A1*   9/2025  Andreasen .......... G06F 11/0793
2026/0003891 A1*   1/2026  Gupta .................. G06F 16/285

* cited by examiner

400

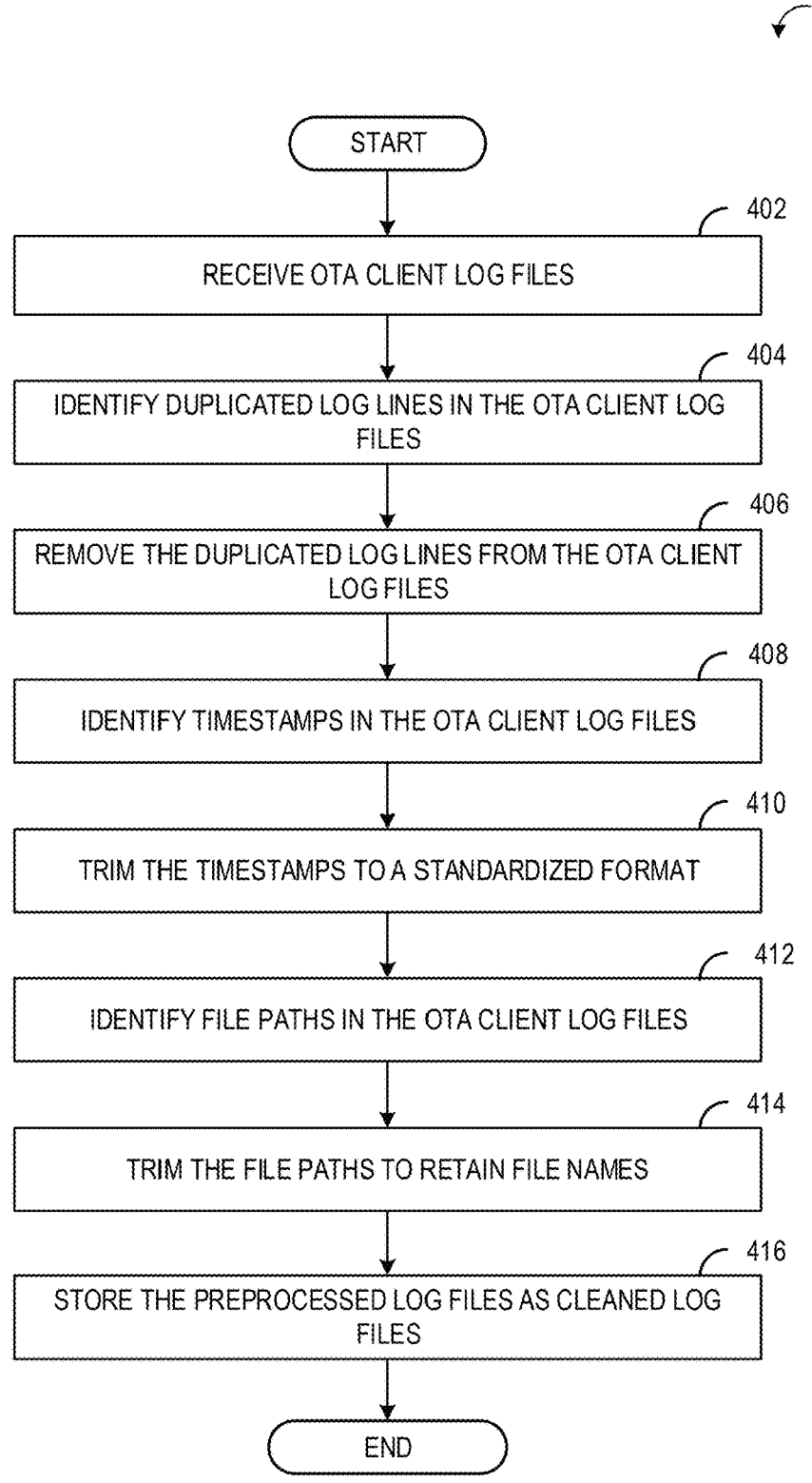

START

402

RECEIVE OTA CLIENT LOG FILES

404

IDENTIFY DUPLICATED LOG LINES IN THE OTA CLIENT LOG FILES

406

REMOVE THE DUPLICATED LOG LINES FROM THE OTA CLIENT LOG FILES

408

IDENTIFY TIMESTAMPS IN THE OTA CLIENT LOG FILES

410

TRIM THE TIMESTAMPS TO A STANDARDIZED FORMAT

412

IDENTIFY FILE PATHS IN THE OTA CLIENT LOG FILES

414

TRIM THE FILE PATHS TO RETAIN FILE NAMES

416

STORE THE PREPROCESSED LOG FILES AS CLEANED LOG FILES

END

FIG. 4

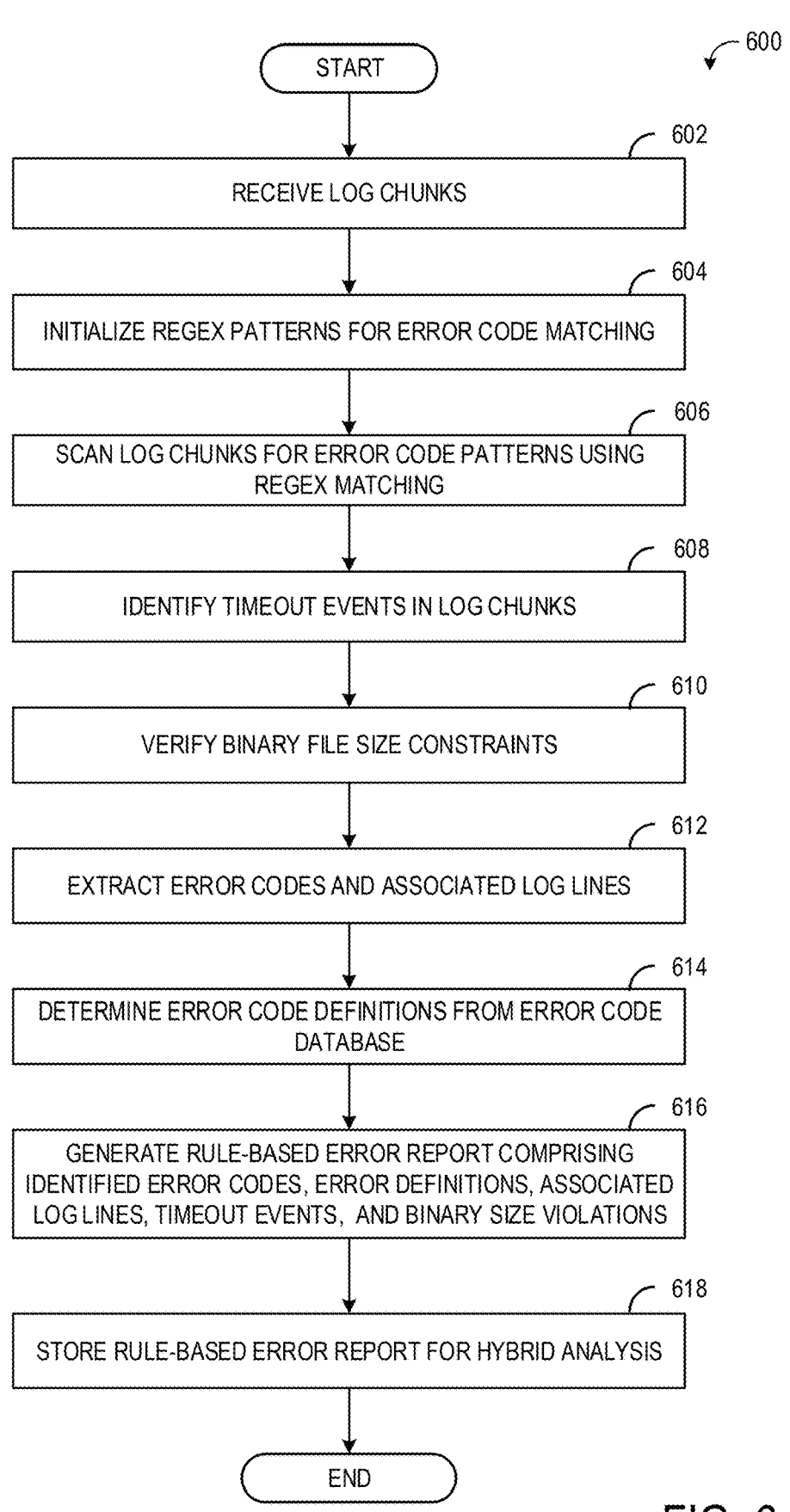

START

600

602
RECEIVE LOG CHUNKS

604
INITIALIZE REGEX PATTERNS FOR ERROR CODE MATCHING

606
SCAN LOG CHUNKS FOR ERROR CODE PATTERNS USING REGEX MATCHING

608
IDENTIFY TIMEOUT EVENTS IN LOG CHUNKS

610
VERIFY BINARY FILE SIZE CONSTRAINTS

612
EXTRACT ERROR CODES AND ASSOCIATED LOG LINES

614
DETERMINE ERROR CODE DEFINITIONS FROM ERROR CODE DATABASE

616
GENERATE RULE-BASED ERROR REPORT COMPRISING IDENTIFIED ERROR CODES, ERROR DEFINITIONS, ASSOCIATED LOG LINES, TIMEOUT EVENTS, AND BINARY SIZE VIOLATIONS

618
STORE RULE-BASED ERROR REPORT FOR HYBRID ANALYSIS

END

FIG. 6

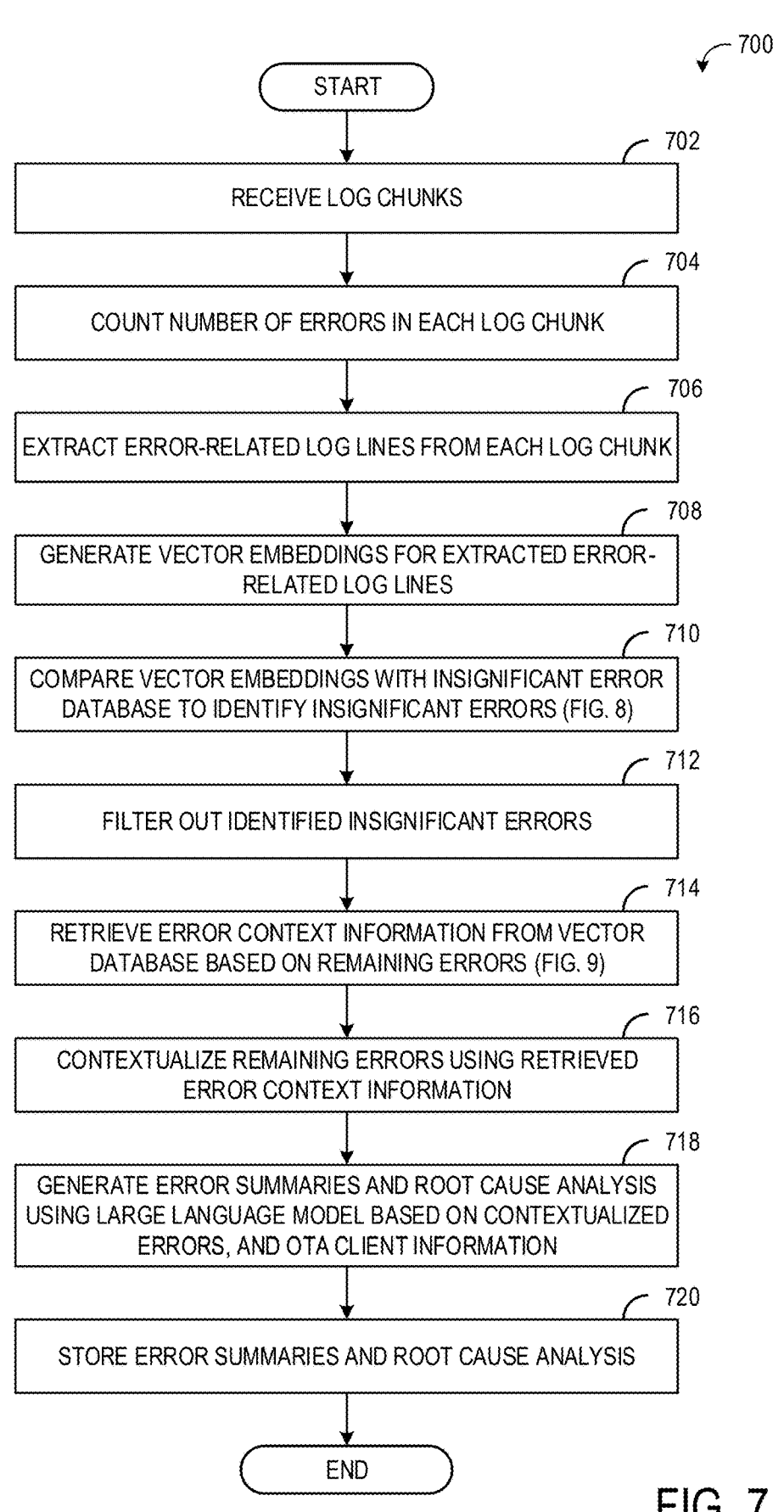

700

START

702
RECEIVE LOG CHUNKS

704
COUNT NUMBER OF ERRORS IN EACH LOG CHUNK

706
EXTRACT ERROR-RELATED LOG LINES FROM EACH LOG CHUNK

708
GENERATE VECTOR EMBEDDINGS FOR EXTRACTED ERROR-RELATED LOG LINES

710
COMPARE VECTOR EMBEDDINGS WITH INSIGNIFICANT ERROR DATABASE TO IDENTIFY INSIGNIFICANT ERRORS (FIG. 8)

712
FILTER OUT IDENTIFIED INSIGNIFICANT ERRORS

714
RETRIEVE ERROR CONTEXT INFORMATION FROM VECTOR DATABASE BASED ON REMAINING ERRORS (FIG. 9)

716
CONTEXTUALIZE REMAINING ERRORS USING RETRIEVED ERROR CONTEXT INFORMATION

718
GENERATE ERROR SUMMARIES AND ROOT CAUSE ANALYSIS USING LARGE LANGUAGE MODEL BASED ON CONTEXTUALIZED ERRORS, AND OTA CLIENT INFORMATION

720
STORE ERROR SUMMARIES AND ROOT CAUSE ANALYSIS

END

SYSTEMS AND METHODS FOR ARTIFICIAL INTELLIGENCE-BASED ANALYSIS OF OVER-THE-AIR CLIENT LOGS

TECHNICAL FIELD

The present disclosure relates generally to the field of software error analysis and, more particularly, to systems and methods for analyzing over-the-air (OTA) client logs from vehicles using artificial intelligence and rule-based approaches.

BACKGROUND

Over-the-air (OTA) software updates have become increasingly utilized in the automotive industry as vehicles incorporate more sophisticated electronic systems and software. When OTA updates fail, Original Equipment Manufacturers (OEMs) collect error logs from affected vehicles and send them to OTA service providers for analysis. These logs contain information about the nature and cause of update failures, but analyzing them presents significant technical challenges.

Traditional approaches to OTA client log analysis rely heavily on manual review by failure analysis engineers (FAEs). These engineers must examine extensive log files to identify error codes, understand error patterns, and determine root causes of update failures. This manual process is time-consuming and resource-intensive, with FAEs spending approximately 20% of their time analyzing client logs. The complexity of these logs is further increased by their length and the interconnected nature of vehicle subsystems, making it difficult to differentiate root causes from dependent subsystem errors. The challenge of log analysis is compounded by the varying implementations across different OEMs. Each manufacturer may customize their OTA system with specific plugins and modifications, resulting in thousands of potential error codes and behaviors. Additionally, OEMs may conduct road tests using test vehicles, generating logs that contain testing-specific errors which must be distinguished from production vehicle issues. These customizations and testing scenarios create additional complexity in identifying and diagnosing errors in client logs from OTA software updates.

Current methods of log analysis are also limited by their inability to efficiently handle duplicated information. When OTA updates fail, the system often makes multiple attempts to complete the update, generating repeated error messages in the logs. This redundancy increases the volume of data that must be processed and can obscure the underlying cause of the failure.

The limitations of manual log analysis highlight the need for a more automated and intelligent approach to processing OTA client logs. A system that can efficiently preprocess logs, distinguish between significant and insignificant errors, and provide contextual analysis would significantly reduce the time and effort required for log analysis while improving the accuracy and consistency of results. Such a system would be particularly valuable given the increasing volume of OTA updates and the growing complexity of vehicle software systems.

SUMMARY

The present disclosure at least partially addresses the issues described above. In one embodiment, a method of analyzing over-the-air (OTA) client logs from vehicles includes receiving OTA client log files comprising error logs generated during OTA software updates of vehicles, preprocessing the OTA client log files to generate cleaned log files by removing duplicated log lines and standardizing log file formats, segmenting the cleaned log files into log chunks based on chunk size parameters, analyzing the log chunks using a rule engine to extract predefined error codes, and analyzing the log chunks using an artificial intelligence (AI) engine. The AI engine analysis includes generating vector embeddings for error-related log lines, comparing the vector embeddings with an insignificant error database to identify and filter out insignificant errors, retrieving error context information from a vector database based on remaining errors, and generating error summaries and root cause analysis using a large language model based on the remaining errors, the error context information, and OTA client information. The method further includes displaying analysis results comprising rule-based error codes and AI-based root cause analysis via a failure analysis engineer (FAE) review interface. This embodiment provides efficient preprocessing and hybrid analysis of OTA client logs through both rule-based and AI approaches, enabling more accurate identification of root causes of errors while filtering out known insignificant errors, thereby reducing the time and effort required for log analysis.

In another embodiment, a system for analyzing over-the-air (OTA) client logs from vehicles includes at least one processor and non-transitory memory storing instructions that, when executed by the at least one processor, cause the processor to perform operations including receiving OTA client log files comprising error logs generated during OTA software updates of vehicles, preprocessing the OTA client log files to generate cleaned log files by removing duplicated log lines and standardizing log file formats, segmenting the cleaned log files into log chunks based on chunk size parameters, analyzing the log chunks using a rule engine to extract predefined error codes, and analyzing the log chunks using an artificial intelligence (AI) engine. The AI engine analysis includes generating vector embeddings for error-related log lines, comparing the vector embeddings with an insignificant error database to identify and filter out insignificant errors, retrieving error context information from a vector database based on remaining errors, and generating error summaries and root cause analysis using a large language model based on the remaining errors, the error context information, and OTA client information. The system displays analysis results comprising rule-based error codes and AI-based root cause analysis via a failure analysis engineer (FAE) review interface. This system embodiment provides an integrated approach to analyzing OTA client logs by combining rule-based error code extraction with AI-powered contextual analysis. The rule engine identifies error patterns through regex matching and predefined rules, while the AI engine performs analysis by generating vector embeddings of error-related log lines and filtering based on similarity comparisons with an insignificant error database. By maintaining separate databases for insignificant errors and error context information, the system distinguishes between errors requiring investigation and those that can be filtered, such as errors arising from OEM-specific plugins or testing vehicle scenarios. The combination of rule-based filtering with contextual AI analysis reduces the time required for FAEs to analyze client logs while maintaining accuracy, particularly advantageous given the varying implementations of OTA systems across different OEMs and the frequent introduction of new plugins and customizations that can generate thousands of potential error codes.

In yet another embodiment, a method of analyzing over-the-air (OTA) client logs from vehicles includes receiving OTA client log files comprising error logs generated during OTA software updates of vehicles and associated OTA client information, preprocessing the OTA client log files to generate cleaned log files, accessing predetermined chunk size parameters and overlap parameters from a configuration database based on a log file type of the cleaned log files, and segmenting the cleaned log files into log chunks based on the accessed chunk size parameters and overlap parameters, wherein each log chunk is assigned a unique identifier and indexed with reference to its original log file location. The method includes analyzing each log chunk using a rule engine to extract predefined error codes and analyzing error-related log lines using an artificial intelligence (AI) engine by generating vector embeddings for extracted error-related log lines, comparing the vector embeddings with an insignificant error database to identify and filter out insignificant errors, retrieving error context information from a vector database based on remaining errors after filtering out the insignificant errors, and filtering the retrieved error context information based on the associated OTA client information. The method further includes aggregating filtered error context information from analyzed log chunks, generating error summaries and root cause analysis using a large language model based on the aggregated filtered error context information, the associated OTA client information, and error patterns identified across multiple log chunks, displaying analysis results via a failure analysis engineer (FAE) review interface, and updating one or more of the insignificant error database and the vector database based on FAE feedback received via the FAE review interface. This embodiment provides a technical solution for continuously improving OTA client log analysis through a feedback loop between failure analysis engineers and the AI-based analysis system. By capturing FAE feedback on analyzed errors and integrating this expert knowledge into both the insignificant error database and vector database, the system becomes increasingly accurate at distinguishing between errors that necessitate investigation and known insignificant errors, such as those arising from OEM-specific plugins or testing vehicle scenarios. The feedback mechanism enables the system to adapt to dynamic changes in OTA implementations across different OEMs, ensuring that customization-specific errors and testing-related issues are properly categorized without requiring manual updates to system specifications. This adaptive capability is particularly advantageous given the varying implementations of OTA systems across manufacturers and the frequent introduction of new plugins and customizations that can generate thousands of potential error codes.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of this disclosure may be better understood upon reading the following description of non-limiting embodiments, with reference to the attached drawings, wherein below:

FIG. 4 is a flowchart illustrating a method for preprocessing OTA client log files, according to an embodiment of the present disclosure;

FIG. 6 is a flowchart illustrating a method for analyzing log chunks using a rule engine, according to an embodiment of the present disclosure;

FIG. 7 is a flowchart illustrating a method for analyzing log chunks using an artificial intelligence engine, according to an embodiment of the present disclosure;

DETAILED DESCRIPTION

The present disclosure provides systems and methods for analyzing over-the-air (OTA) client logs using a hybrid approach combining rule-based error code extraction with AI-powered contextual analysis. Traditional approaches to OTA client log analysis rely heavily on manual review by failure analysis engineers (FAEs), requiring extensive time examining log files to identify error codes, understand error patterns, and determine root causes of update failures. The complexity of these logs is increased by their length, the interconnected nature of vehicle subsystems, and varying implementations across different Original Equipment Manufacturers (OEMs). Each manufacturer may customize their OTA system with specific plugins and modifications, resulting in thousands of potential error codes and behaviors that may need to be distinguished from testing vehicle errors.

Figure 1:
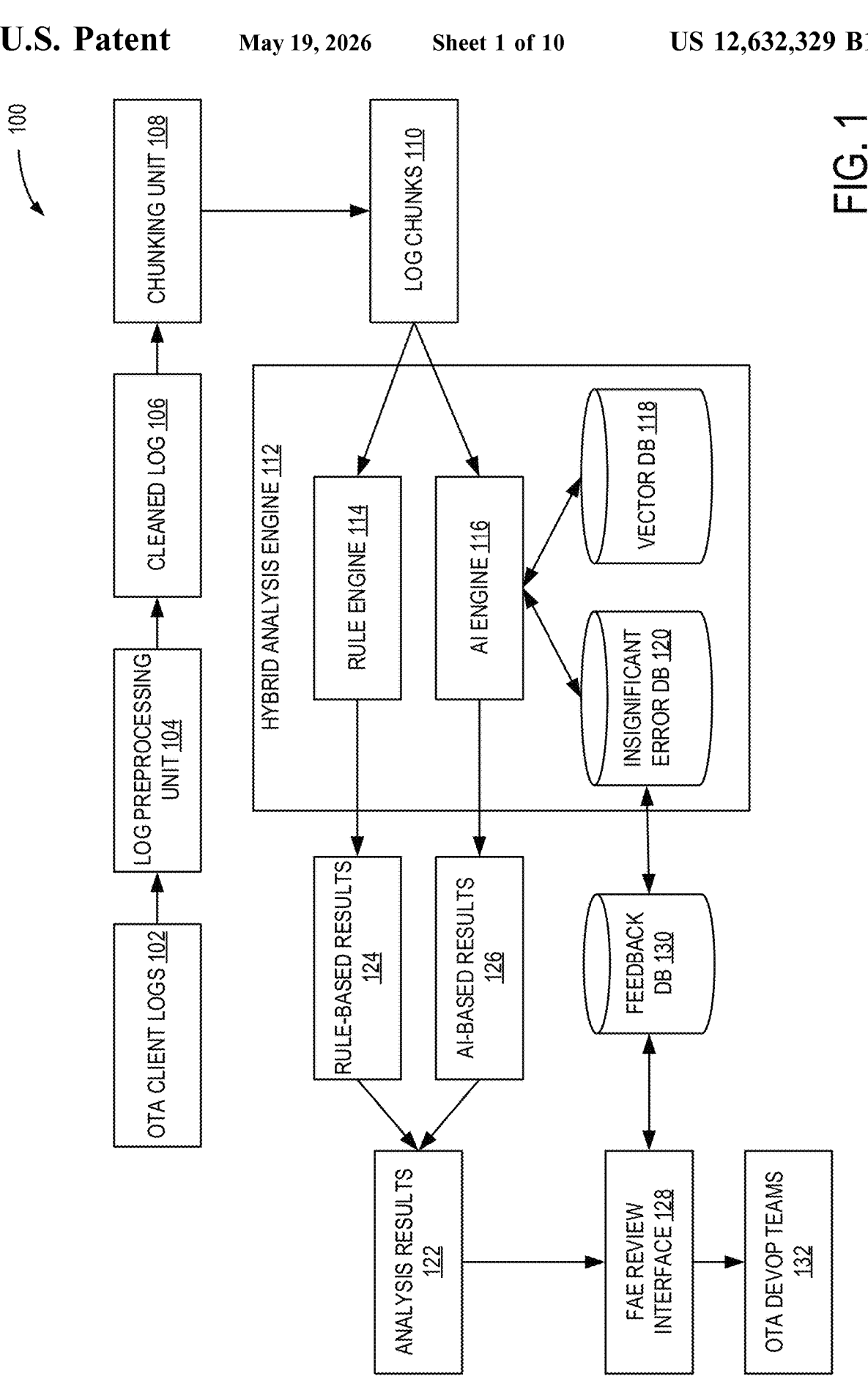
FIG. 1 is a schematic diagram illustrating a process for analyzing over-the-air (OTA) client logs, according to an embodiment of the present disclosure.
Figure 2:
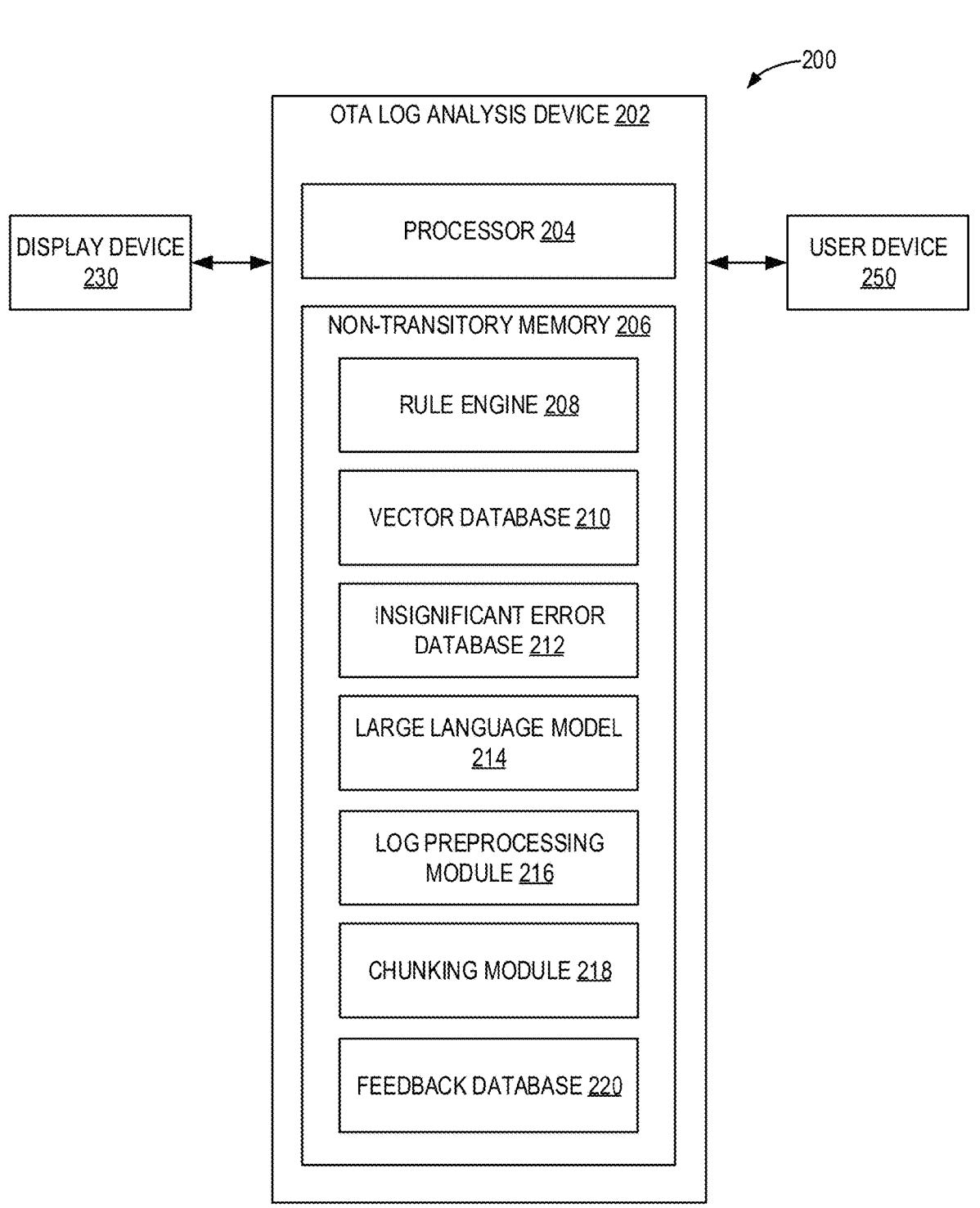
FIG. 2 is a block diagram illustrating an OTA log analysis system, according to an embodiment of the present disclosure.
Figure 5:
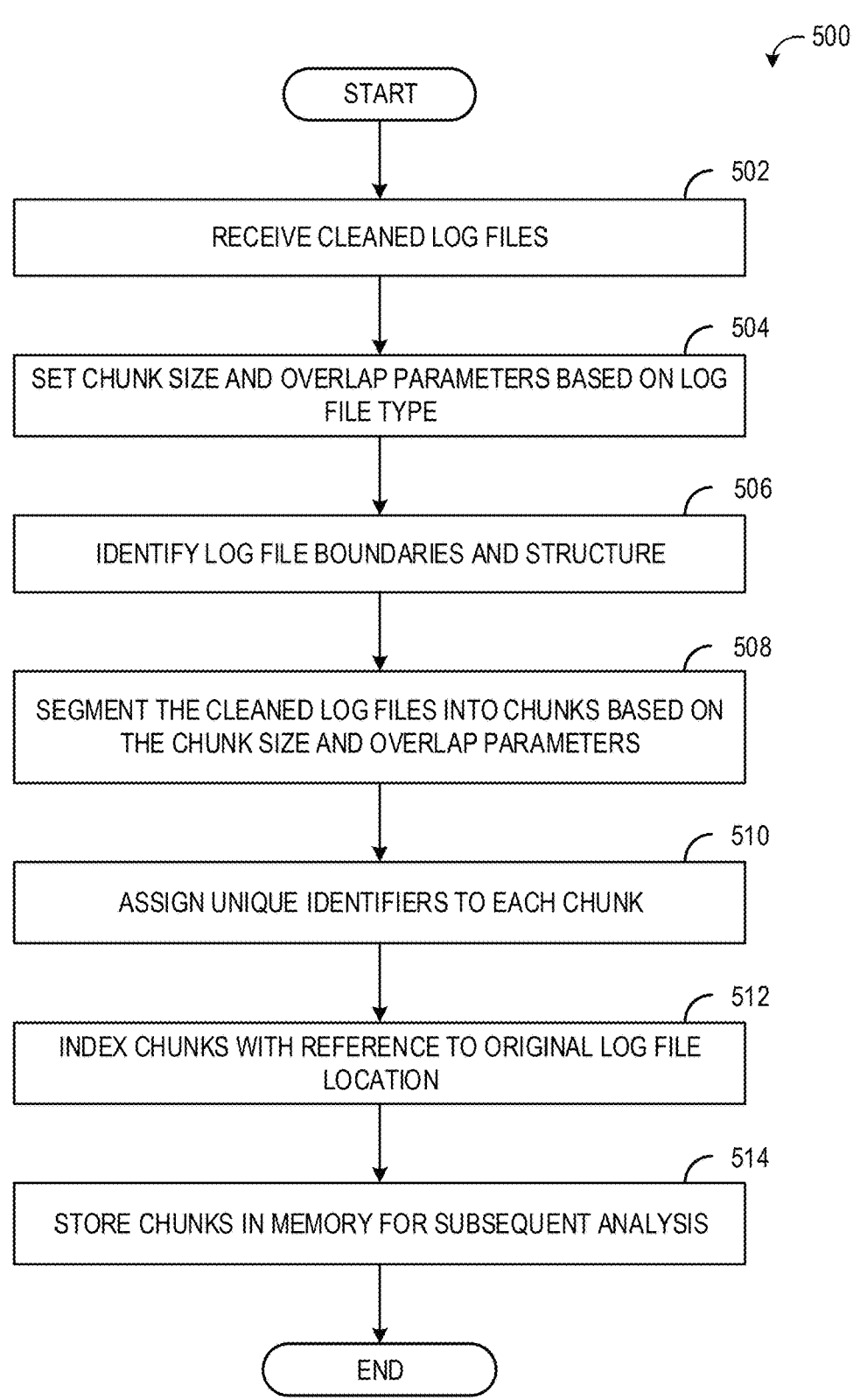
FIG. 5 is a flowchart illustrating a method for generating log chunks from cleaned log files, according to an embodiment of the present disclosure.
Figure 9:
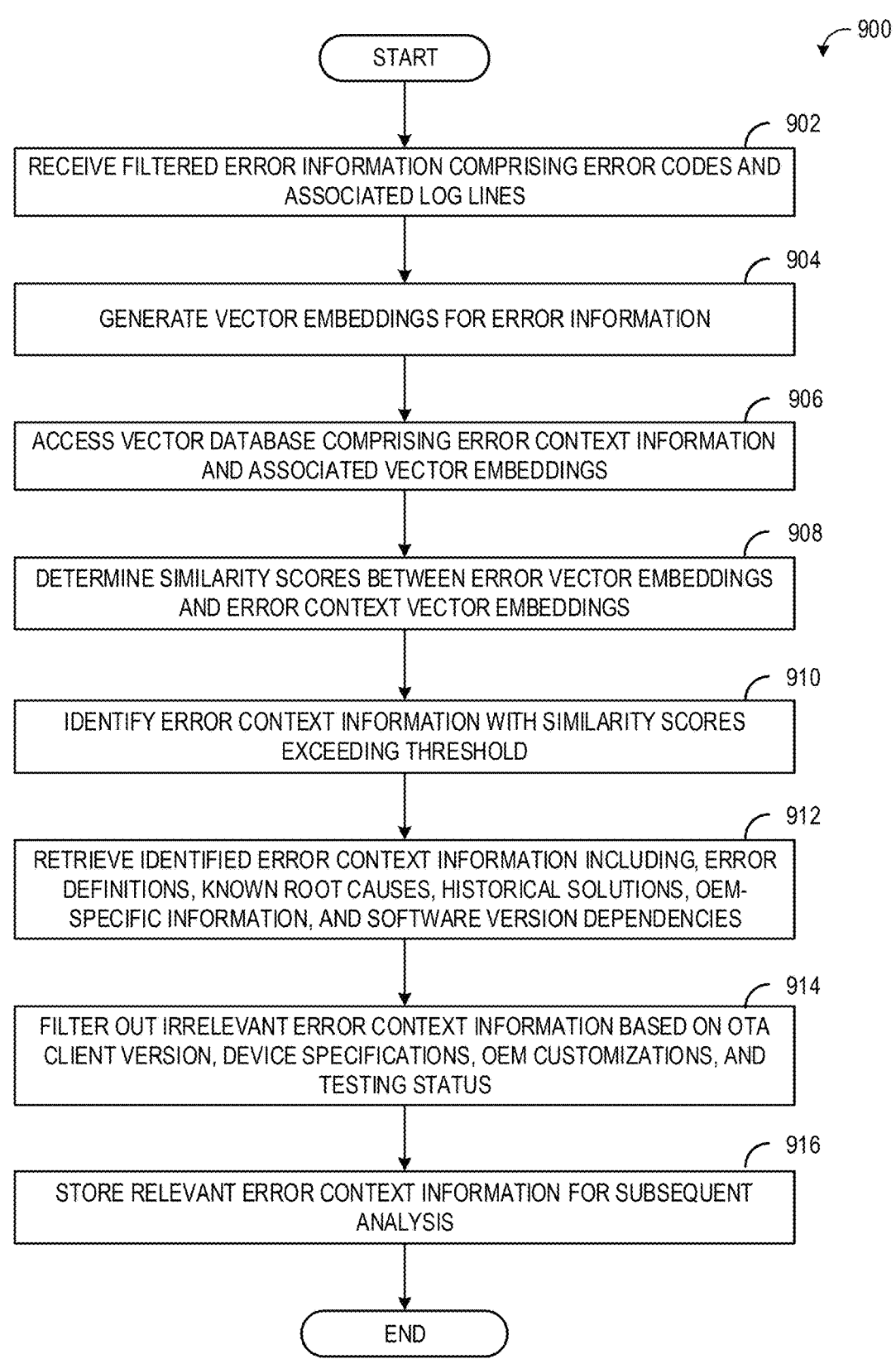
FIG. 9 is a flowchart illustrating a method for retrieving error context information from a vector database, according to an embodiment of the present disclosure.
Figure 10:
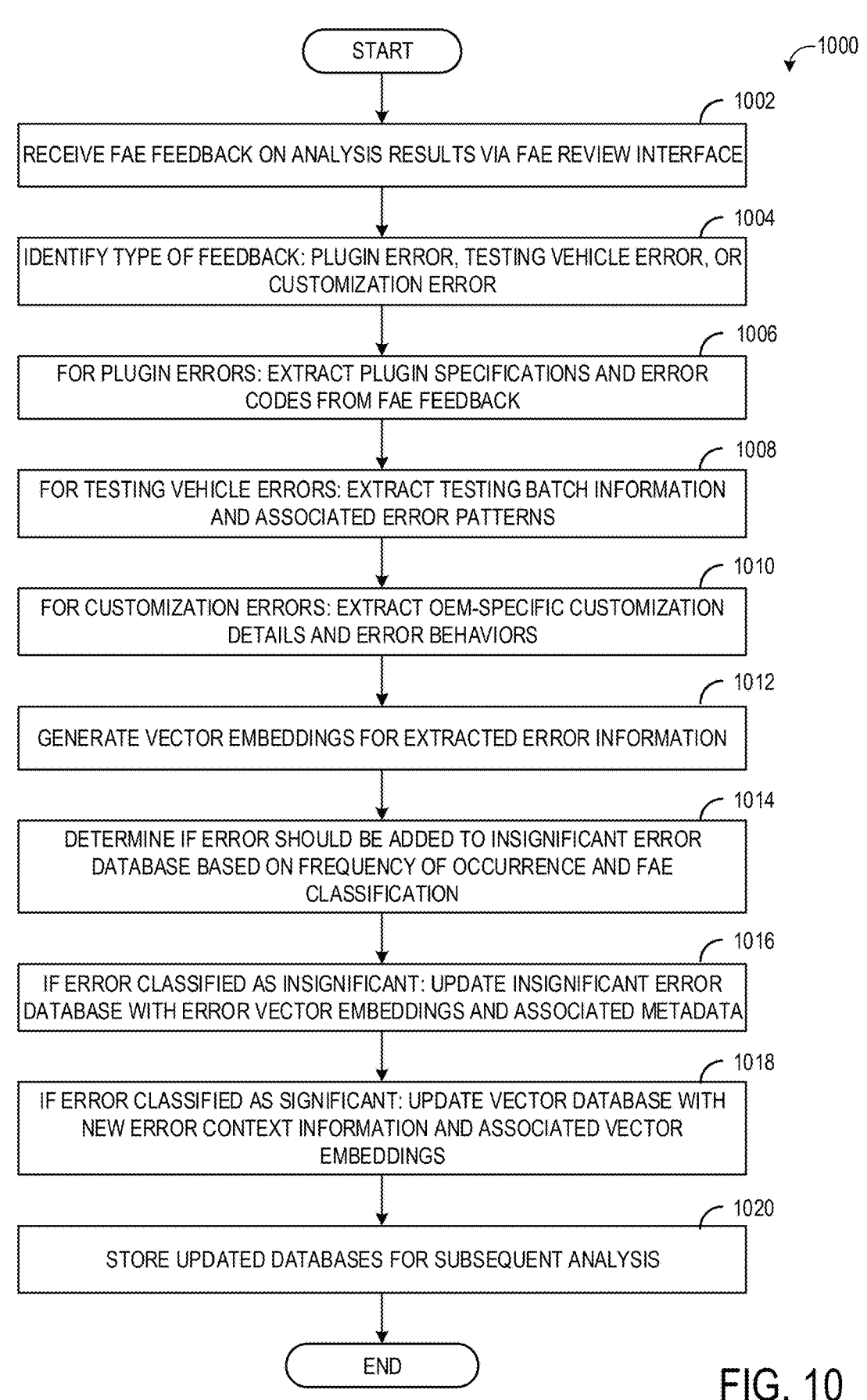
FIG. 10 is a flowchart illustrating a method for updating databases based on failure analysis engineer feedback, according to an embodiment of the present disclosure.

The systems and methods disclosed herein address these challenges through an integrated approach illustrated across several figures. FIG. 1 shows a schematic diagram of a process for analyzing OTA client logs, depicting the flow from raw log files through preprocessing, chunking, and hybrid analysis stages to generate actionable results. FIG. 2 illustrates a block diagram of an OTA log analysis system showing the components that enable the hybrid analysis approach. The overall method of analyzing OTA client logs is detailed in FIG. 3, which outlines the steps from log file reception through analysis and feedback incorporation. The preprocessing of log files for removing duplicated information and standardizing formats is detailed in FIG. 4. FIG. 5 illustrates the method for generating log chunks, enabling processing of large log files while maintaining contextual relationships. The rule-based analysis component is detailed in FIG. 6, showing how predefined error codes are extracted through regex matching and other rule-based approaches. FIG. 7 depicts the AI-based analysis process, including vector embedding generation and comparison with an insignificant error database. The identification of insignificant errors through vector embedding comparison is detailed in FIG. 8, while FIG. 9 shows the process of retrieving and filtering error context information from a vector database. FIG. 10 illustrates the feedback mechanism that enables improvement of the system through FAE input, allowing the databases to adapt to new error patterns and OEM-specific implementations.

Together, these components enable analyzing OTA client logs while maintaining accuracy through a combination of rule-based filtering and contextual AI analysis. This may be particularly advantageous given the varying implementations of OTA systems across different OEMs and the introduction of new plugins and customizations that can generate thousands of potential error codes. The system's ability to adapt through FAE feedback allows it to handle changes in OTA implementations without requiring manual updates to system specifications.

In one embodiment, a process for analyzing OTA client logs, as depicted in FIG. 1, may be performed by an OTA log analysis system 200, as shown in FIG. 2. The process for analyzing OTA client logs may include one or more operations included in method 300, shown in FIG. 3. Methods 300 may preprocess log files by conducting one or more operations of method 400, shown in FIG. 4, generate log chunks through operations of method 500, shown in FIG. 5, and analyze logs through rule-based and AI-based approaches detailed in methods 600 and 700, shown in FIGS. 6 and 7 respectively. The AI-based analysis may include identifying insignificant errors through vector embedding comparison operations of method 800, shown in FIG. 8, and retrieving error context information through operations of method 900, shown in FIG. 9. The system may further update databases based on FAE feedback through operations of method 1000, shown in FIG. 10, enabling continuous improvement of the analysis capabilities.

Referring to FIG. 1, a hybrid process 100 for analyzing over-the-air (OTA) client logs is shown, illustrating one embodiment for processing and analyzing client logs using both rule-based and artificial intelligence based approaches. The process 100 is particularly advantageous in applications such as automotive OTA software updates, where efficient analysis of error logs enables rapid identification and resolution of update issues. The process 100 combines rule-based analysis with AI techniques to provide a more robust analysis of OTA client logs, enabling both rapid identification of known error patterns and better root cause analysis.

The OTA client logs 102 represent the raw log files generated during OTA software updates of vehicles. In one embodiment, the OTA client logs 102 may include error logs containing information about the nature and cause of update issues, including error codes, timestamps, and system messages. In another embodiment, the OTA client logs 102 may include additional client information such as client version, device identifier, model name, manufacturer name, and configuration parameters. These logs are collected from affected vehicles when OTA updates encounter issues and are sent to OTA service providers for analysis. The OTA client logs 102 may contain useful diagnostic information that, when properly analyzed, can provide insights into the root causes of update issues.

The log preprocessing unit 104 processes the OTA client logs 102 to generate cleaned log files by removing duplicated information and standardizing formats. In one embodiment, the log preprocessing unit 104 identifies and removes duplicated log lines that occur when the OTA system makes multiple attempts to complete an update, generating repeated error messages based on pre-configured retry parameters. For example, if an OTA update campaign is configured for a maximum of three retry attempts, the same error messages may be repeated up to three times in the log file. In another embodiment, the preprocessing unit 104 standardizes the format of timestamps and file paths, trimming timestamps to a standardized format and retaining only file names rather than complete directory paths. For instance, extremely long timestamps may be trimmed to a consistent format, and file paths may be shortened to include only the relevant file name rather than the entire directory structure. This preprocessing reduces the volume of data that must be processed while maintaining the integrity of the error information. The log preprocessing unit 104 may also perform additional formatting and standardization operations to ensure consistent analysis of logs from different vehicle models or manufacturers, such as standardizing line endings, character encodings, and error message formats across different OEM implementations.

The cleaned log 106 represents the preprocessed log files after removal of duplicated information and standardization of formats. In one embodiment, the cleaned log 106 contains only unique error messages and events, with standardized formatting of timestamps and file paths. In another embodiment, the cleaned log 106 may be stored in memory for subsequent chunking and analysis, with references maintained to the original log file locations. The cleaned log 106 provides a more efficient and standardized input for subsequent analysis steps while preserving the continuity of diagnostic information contained in the original logs.

The chunking unit 108 segments the cleaned log 106 into chunks based on predetermined chunk size parameters. In one embodiment, the chunking unit 108 sets chunk size and overlap parameters based on the log file type, identifying log file boundaries and structure to ensure proper segmentation. In another embodiment, the chunking unit 108 assigns unique identifiers to each chunk and indexes them with reference to their original log file location, enabling traceability of analysis results back to source logs. The chunking unit 108 may adjust chunk sizes dynamically based on the content and structure of different log types to improve subsequent analysis steps.

The log chunks 110 represent the segmented portions of the cleaned log files. In one embodiment, each log chunk 110 contains a portion of the log file sized according to the predetermined chunk size parameters, with overlap between chunks to maintain context across chunk boundaries. In another embodiment, the log chunks 110 are stored with their unique identifiers and index information for processing by the hybrid analysis engine 112. The log chunks 110 enable parallel processing of large log files while maintaining contextual relationships between different portions of the logs.

The hybrid analysis engine 112 comprises both a rule engine 114 and an AI engine 116, enabling comprehensive analysis through both rule-based approaches and AI techniques. The rule engine 114 analyzes log chunks using predefined rules and regex patterns to extract error codes. In one embodiment, the rule engine 114 scans log chunks for specific error code patterns, identifies timeout events, and verifies binary file size constraints. In another embodiment, the rule engine 114 generates rule-based error reports comprising identified error codes, error definitions, associated log lines, timeout events, and binary size violations. The hybrid analysis engine 112 leverages the complementary strengths of both analysis approaches to provide thorough and efficient log analysis.

The AI engine 116 performs analysis using vector embeddings and large language models. In one embodiment, the AI engine 116 generates vector embeddings for error-related log lines, compares them with an insignificant error database to filter out known insignificant errors, and retrieves error context information from a vector database. For example, when analyzing a log chunk containing multiple error messages, the AI engine 116 may identify error patterns that match known plugin-specific errors or testing vehicle scenarios stored in the insignificant error database. In another embodiment, the AI engine 116 generates error summaries and root cause analysis using a large language model based on the remaining errors, error context information, and OTA client information. The AT engine 116 contextualizes errors by considering OTA client version information, device specifications, manufacturer customizations, and testing status to provide more accurate and relevant analysis. For instance, when analyzing an error from a specific OEM implementation with custom plugins, the AI engine 116 references relevant plugin specifications and error codes to properly interpret the error context. The AT engine 116 provides analysis capabilities that can identify patterns and relationships not captured by rule-based analysis alone, particularly in cases where error messages may not directly correspond to specific error codes but rather describe system behaviors that indicate underlying issues.

The vector database 118 stores error context information and associated vector embeddings. In one embodiment, the vector database 118 contains error definitions, known root causes, historical solutions, OEM-specific information, and software version dependencies. In another embodiment, the vector database 118 is updated based on feedback from failure analysis engineers to incorporate new error patterns and solutions. The vector database 118 serves as a knowledge repository that grows more comprehensive over time through continuous updates and feedback incorporation.

The insignificant error database 120 stores vector embeddings of known insignificant errors. In one embodiment, these include errors arising from OEM-specific plugins or testing vehicle scenarios that do not require investigation. In another embodiment, the insignificant error database 120 is continuously updated based on frequency of occurrence and FAE classification of errors. The insignificant error database 120 helps improve analysis efficiency by filtering out known benign errors that do not require detailed investigation.

The rule-based results 124 and AI-based results 126 are combined to generate comprehensive analysis results 122. In one embodiment, the analysis results 122 include both rule-based error codes and AI-generated root cause analysis, providing multiple perspectives on the identified errors. In another embodiment, the analysis results 122 may include suggested solutions based on historical resolution data. The combined analysis results provide a thorough understanding of log contents while leveraging the strengths of both analysis approaches.

The FAE review interface 128 displays the analysis results and captures feedback from failure analysis engineers. In one embodiment, the interface allows FAEs to review both rule-based and AI-based analysis results and provide feedback on error classifications. In another embodiment, the interface enables FAEs to document new error patterns related to OEM customizations or testing scenarios. The FAE review interface 128 facilitates continuous improvement of the analysis system through expert feedback and validation.

The feedback database 130 stores FAE feedback for continuous improvement of the analysis system. In one embodiment, the feedback database 130 captures plugin errors, testing vehicle errors, and customization errors identified by FAEs, including specific information about OEM customizations, testing scenarios, and associated error patterns. For example, when an FAE identifies that certain error codes are associated with a newly added OEM plugin, this information is stored in the feedback database 130 to improve future analysis of similar errors. In another embodiment, the feedback is used to update the insignificant error database 120 and vector database 118, improving future analysis accuracy by incorporating expert knowledge about error classifications and contextual relationships. The feedback database 130 enables the system to adapt and improve based on expert knowledge and real-world experience, particularly in cases where OEMs frequently modify their implementations or conduct testing using specialized test vehicles. The database may store metadata about feedback entries, such as timestamp, FAE identifier, and classification type (plugin error, testing error, or customization error), enabling tracking of feedback patterns and system improvements over time.

The OTA DevOp teams 132 receive the verified analysis results and implement corresponding system modifications and enhancements based thereon. In one embodiment, the OTA DevOp teams 132 utilize the analysis results to remediate identified errors within the OTA system architecture and associated binary files. In another embodiment, the OTA DevOp teams 132 may modify system specifications responsive to newly discovered error patterns identified through the analysis process. The OTA DevOp teams 132 thus constitute a terminal stage in the analysis workflow wherein analytical insights are operationalized into tangible system refinements and improvements. Such refinements and improvements may include, but are not limited to, modifications to OTA client implementations, updates to error handling protocols, and optimizations of binary file generation processes.

Referring to FIG. 2, an OTA log analysis system 200 for analyzing over-the-air logs is shown, illustrating one embodiment for processing and analyzing client logs using both rule-based and artificial intelligence based approaches. The OTA log analysis system 200 is configured to analyze error logs generated during OTA software updates of vehicles and provide analysis results to failure analysis engineers.

The OTA log analysis device 202 comprises a processor 204 and non-transitory memory 206 storing instructions and modules for analyzing OTA client logs. In one embodiment, the OTA log analysis device 202 may be implemented as a server system accessible via a network connection. In another embodiment, the OTA log analysis device 202 may be implemented as a distributed system with components deployed across multiple computing nodes.

The processor 204 is configured to execute instructions stored in the non-transitory memory 206 to perform log analysis operations. In one embodiment, the processor 204 may include multiple processing cores for parallel processing of log chunks. In another embodiment, the processor 204 may include specialized hardware accelerators for vector operations used in comparing embeddings.

The non-transitory memory 206 stores various software modules and databases used in the log analysis process. In one embodiment, the non-transitory memory 206 may comprise solid state storage devices. In another embodiment, the non-transitory memory 206 may comprise a combination of fast access memory for active processing and slower archival storage for historical logs and feedback data.

The rule engine 208 analyzes log chunks using predefined rules and regex patterns to extract error codes. In one embodiment, the rule engine 208 scans log chunks for specific error code patterns, identifies timeout events, and verifies binary file size constraints. In another embodiment, the rule engine 208 generates rule-based error reports comprising identified error codes, error definitions, associated log lines, timeout events, and binary size violations.

The vector database 210 stores error context information and associated vector embeddings. In one embodiment, the vector database 210 contains error definitions, known root causes, historical solutions, OEM-specific information, and software version dependencies. In another embodiment, the vector database 210 is updated based on feedback from failure analysis engineers to incorporate new error patterns and solutions.

The insignificant error database 212 stores vector embeddings of known insignificant errors. In one embodiment, these include errors arising from OEM-specific plugins or testing vehicle scenarios that do not require investigation. In another embodiment, the insignificant error database 212 is continuously updated based on frequency of occurrence and FAE classification of errors.

The large language model 214 generates error summaries and root cause analysis based on contextualized errors and OTA client information. In one embodiment, the large language model 214 processes filtered error context information to generate natural language descriptions of error causes. In another embodiment, the large language model 214 suggests potential solutions based on historical resolution data stored in the vector database 210.

The log preprocessing module 216 processes raw OTA client logs to generate cleaned log files. In one embodiment, the log preprocessing module 216 removes duplicated log lines resulting from multiple update attempts and standardizes timestamp and file path formats. In another embodiment, the log preprocessing module 216 performs additional formatting operations to ensure consistent analysis of logs from different vehicle models and manufacturers.

The chunking module 218 segments cleaned log files into chunks based on predetermined parameters. In one embodiment, the chunking module 218 sets chunk size and overlap parameters based on log file type, identifying log file boundaries and structure to ensure proper segmentation. In another embodiment, the chunking module 218 assigns unique identifiers to chunks and indexes them with reference to their original log file location.

The feedback database 220 stores FAE feedback for continuous improvement of the analysis system. In one embodiment, the feedback database 220 captures plugin errors, testing vehicle errors, and customization errors identified by FAEs, including specific information about OEM customizations, testing scenarios, and associated error patterns. In another embodiment, the feedback database 220 stores metadata about feedback entries to enable tracking of feedback patterns and system improvements over time.

The user device 250 enables FAEs to interact with the OTA log analysis system 200. In one embodiment, the user device 250 may comprise a desktop computer or laptop with secure network access to the OTA log analysis device 202. In another embodiment, the user device 250 may include mobile devices with specialized applications for reviewing analysis results and providing feedback.

The display device 230 presents analysis results and captures FAE feedback through a graphical interface. In one embodiment, the display device 230 shows both rule-based error codes and AI-generated root cause analysis, allowing FAEs to review and validate results. In another embodiment, the display device 230 provides interactive visualization tools for exploring error patterns and relationships across multiple log files.

Figure 3:
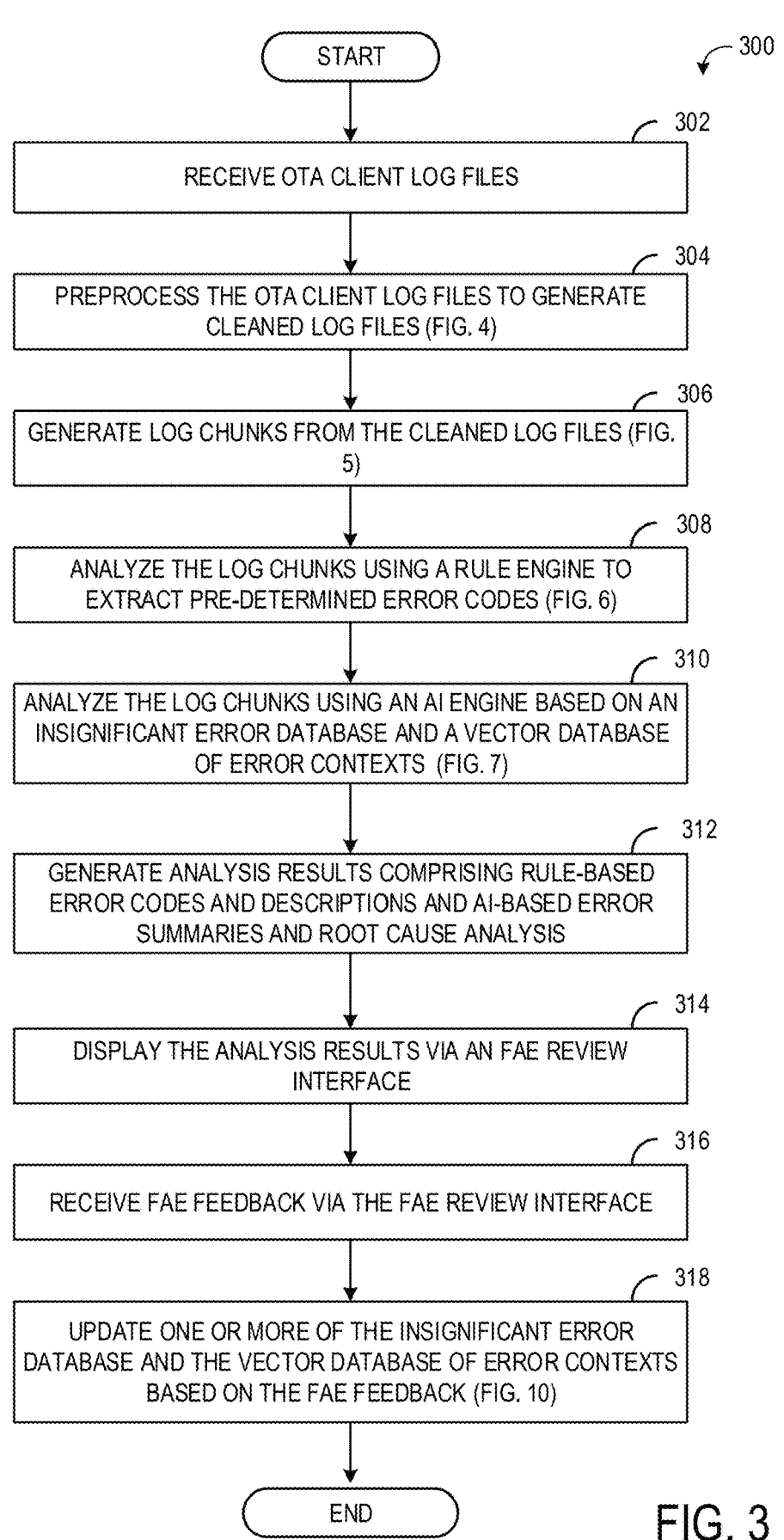
FIG. 3 is a flowchart illustrating a method for analyzing OTA client logs using hybrid analysis, according to an embodiment of the present disclosure.

Referring to FIG. 3, a flowchart of a method 300 for analyzing over-the-air (OTA) client log files is shown, illustrating one embodiment for processing and analyzing client logs using both rule-based and artificial intelligence based approaches. The method 300 enables efficient analysis of error logs from vehicle OTA software updates through a hybrid approach combining traditional rule-based error code extraction with AI-powered contextual analysis.

At operation 302, the OTA log analysis system receives OTA client log files comprising error logs generated during OTA software updates of vehicles. In one embodiment, the OTA log analysis system processes OTA client log files including error logs containing information about the nature and cause of update issues, including error codes, timestamps, and system messages. The OTA client log files may further include client information such as client version, device identifier, model name, manufacturer name, and configuration parameters. In another embodiment, the OTA client log files are collected from affected vehicles when OTA updates encounter issues and are sent to OTA service providers for analysis through a secure network connection.

At operation 304, the OTA log analysis system preprocesses the OTA client log files to generate cleaned log files by removing duplicated log lines and standardizing log file formats. In one embodiment, preprocessing includes identifying and removing duplicated log lines that occur when the OTA system makes multiple attempts to complete an update based on pre-configured retry parameters. For example, if an OTA update campaign is configured for a maximum of three retry attempts, the same error messages may be repeated up to three times in the log file. In another embodiment, preprocessing includes standardizing the format of timestamps and file paths by trimming timestamps to a consistent format and retaining only file names rather than complete directory paths to optimize token usage for subsequent AI analysis.

At operation 306, the OTA log analysis system generates log chunks from the cleaned log files based on predetermined chunk size parameters. In one embodiment, chunk size and overlap parameters are set based on the log file type, with log file boundaries and structure being identified to ensure proper segmentation. Each chunk may be assigned a unique identifier and indexed with reference to its original log file location. In another embodiment, the chunks are stored with their unique identifiers and index information for subsequent analysis, enabling parallel processing of large log files while maintaining contextual relationships between different portions of the logs.

At operation 308, the OTA log analysis system analyzes the log chunks using a rule engine to extract pre-determined error codes. In one embodiment, the rule engine scans log chunks for specific error code patterns using regex matching, identifies timeout events, and verifies binary file size constraints. For example, the rule engine may identify error code 001 when a binary file size exceeds available vehicle storage, or identify timeout events when update duration exceeds predetermined thresholds. In another embodiment, the rule engine generates rule-based error reports comprising identified error codes, error definitions, associated log lines, timeout events, and binary size violations.

At operation 310, the OTA log analysis system analyzes the log chunks using an AI engine based on an insignificant error database and a vector database of error contexts. In one embodiment, the AI engine generates vector embeddings for error-related log lines and compares them with an insignificant error database to identify and filter out known insignificant errors, such as those arising from OEM-specific plugins or testing vehicle scenarios. The comparison may use similarity thresholds and error code consistency checks to ensure accurate filtering. In another embodiment, the AI engine retrieves error context information from a vector database based on remaining errors after filtering, with the context information including error definitions, known root causes, historical solutions, OEM-specific information, and software version dependencies.

At operation 312, the OTA log analysis system generates analysis results comprising rule-based error codes and descriptions and AI-based error summaries and root cause analysis. In one embodiment, the analysis results include both rule-based error codes and AI-generated root cause analysis, providing multiple perspectives on the identified errors. The AI-based analysis may include natural language summaries describing error causes and suggested solutions based on historical resolution data. In another embodiment, the OTA log analysis system contextualizes errors by considering OTA client version information, device specifications, manufacturer customizations, and testing status to provide more accurate and relevant analysis.

At operation 314, the OTA log analysis system displays the analysis results via a failure analysis engineer (FAE) review interface. In one embodiment, the interface shows both rule-based error codes and AI-based root cause analysis, allowing FAEs to review and validate results. The interface may highlight specific error lines in logs and provide summaries including error location, number of errors, potential root causes, and possible solutions. In another embodiment, the interface provides interactive visualization tools for exploring error patterns and relationships across multiple log files.

At operation 316, the OTA log analysis system receives FAE feedback via the FAE review interface regarding the analysis results. In one embodiment, the interface allows FAEs to review both rule-based and AI-based analysis results and provide feedback on error classifications, particularly for plugin errors, testing vehicle errors, or customization errors. In another embodiment, the interface enables FAEs to document new error patterns related to OEM customizations or testing scenarios, including specific information about plugin specifications, testing batch information, and associated error patterns.

At operation 318, the OTA log analysis system updates one or more of the insignificant error database and the vector database of error contexts based on the FAE feedback. In one embodiment, the OTA log analysis system determines if newly identified errors should be added to the insignificant error database based on frequency of occurrence and FAE classification. For example, if an FAE identifies that certain error codes are associated with a newly added OEM plugin, this information may be stored to improve future analysis of similar errors. In another embodiment, the OTA log analysis system updates the vector database with new error context information and associated vector embeddings when errors are classified as significant based on impacting OTA functionality or affecting multiple OEM implementations.

The method 300 provides a technical solution for analyzing OTA client logs by combining traditional rule-based analysis with AI-powered contextual understanding. This hybrid approach enables both rapid identification of known error patterns through rule-based analysis and sophisticated interpretation of complex error scenarios through AI analysis. The system's ability to filter out insignificant errors through vector embedding comparison with a continuously updated database of known insignificant errors significantly reduces noise in the analysis results. The contextualization of remaining errors using a vector database of error contexts enables more accurate root cause analysis by considering OEM-specific implementations, plugin specifications, and historical solutions. The continuous feedback loop between FAEs and the analysis system allows for ongoing improvement in error classification and context understanding, particularly valuable given the varying implementations of OTA systems across different OEMs and the frequent introduction of new plugins and customizations that can generate thousands of potential error codes. This adaptive capability ensures the system remains effective even as OEM implementations evolve and new error patterns emerge.

Referring to FIG. 4, a flowchart of a method 400 for preprocessing OTA client log files is shown, illustrating one embodiment for cleaning and standardizing log files prior to analysis. The method 400 enables efficient preprocessing of error logs from vehicle OTA software updates by removing duplicated information and standardizing formats to optimize subsequent analysis steps.

At operation 402, an OTA log analysis system receives OTA client log files comprising error logs generated during OTA software updates of vehicles. In one embodiment, the OTA client log files include error logs containing information about the nature and cause of update issues, including error codes, timestamps, system messages, and client information such as client version, device identifier, model name, manufacturer name, and configuration parameters. In another embodiment, the OTA client log files are collected from affected vehicles when OTA updates encounter issues and are sent to OTA service providers for analysis through a secure network connection.

At operation 404, the OTA log analysis system identifies duplicated log lines in the OTA client log files. In one embodiment, the system scans the log files to identify repeated error messages that occur when the OTA system makes multiple attempts to complete an update based on pre-configured retry parameters. For example, if an OTA update campaign is configured for a maximum of three retry attempts, the same error messages may be repeated up to three times in the log file. In another embodiment, the system identifies duplicated log lines by comparing message content, error codes, and associated timestamps across the log file.

At operation 406, the OTA log analysis system removes the duplicated log lines from the OTA client log files. In one embodiment, the system maintains only the first occurrence of each duplicated log line while preserving the temporal sequence of events. In another embodiment, the system retains metadata about the number of removed duplicates to provide context about retry attempts during subsequent analysis.

At operation 408, the OTA log analysis system identifies timestamps in the OTA client log files. In one embodiment, the system locates timestamp information associated with each log entry using pattern matching to identify common timestamp formats. In another embodiment, the system extracts both absolute and relative timing information to maintain temporal relationships between events.

At operation 410, the OTA log analysis system trims the timestamps to a standardized format. In one embodiment, the system converts timestamps to a consistent format for efficient token usage in subsequent AI analysis. In another embodiment, the system standardizes timezone information and temporal resolution across all log entries to ensure consistent time-based analysis.

At operation 412, the OTA log analysis system identifies file paths in the OTA client log files. In one embodiment, the system locates complete directory paths and file references within log entries using pattern matching. In another embodiment, the system identifies both absolute and relative file paths to ensure comprehensive preprocessing.

At operation 414, the OTA log analysis system trims the file paths to retain file names. In one embodiment, the system extracts only the relevant file names from complete directory paths to reduce token usage while maintaining reference information. In another embodiment, the system preserves a mapping between shortened file names and their original paths to maintain traceability.

At operation 416, the OTA log analysis system stores the preprocessed log files as cleaned log files. In one embodiment, the system saves the cleaned log files with standardized formats and removed duplications while maintaining references to their original source files. In another embodiment, the system includes metadata about the preprocessing operations performed, including the number of duplicates removed and format standardizations applied.

The method 400 provides efficient preprocessing of OTA client logs by removing redundant information and standardizing formats. This preprocessing is particularly valuable for increasing computational efficiency in subsequent analysis steps, including both rule-based error code extraction and AI-powered contextual analysis. The removal of duplicated log lines reduces noise in the analysis while maintaining information about system behavior. The standardization of timestamps and file paths enables consistent processing across different OEM implementations and log formats while optimizing token usage for AI analysis steps.

Referring to FIG. 5, a flowchart of a method 500 for segmenting log files for analysis is shown, illustrating one embodiment for processing and segmenting cleaned log files into chunks for subsequent analysis. The method 500 enables efficient processing of large log files while maintaining contextual relationships between different portions of the logs.

At operation 502, an OTA log analysis system receives cleaned log files that have been preprocessed to remove duplicated log lines and standardize formats. In one embodiment, the cleaned log files include error logs containing information about the nature and cause of update issues, with standardized timestamps and file paths for efficient token usage in subsequent AI analysis. In another embodiment, the cleaned log files maintain references to their original source files and include metadata about preprocessing operations performed, including the number of duplicates removed and format standardizations applied.

At operation 504, the OTA log analysis system sets chunk size and overlap parameters based on log file type. In one embodiment, the system accesses predetermined chunk size parameters and overlap parameters from a configuration database based on the log file type, with parameters determined through experimental validation for different types of log files. For example, structured log files containing primarily error codes and system messages may use smaller chunk sizes compared to log files containing lengthy descriptive text. In another embodiment, the chunk size and overlap parameters are dynamically adjusted based on the content density and distribution of error messages within log files.

At operation 506, the OTA log analysis system identifies log file boundaries and structure. In one embodiment, the system analyzes the cleaned log files to identify natural segmentation points such as timestamp-based divisions, error code sequences, or logical groupings of related events. For example, the system may identify boundaries between different update attempts or between different phases of an OTA update process. In another embodiment, the system determines structural elements such as header information, error code blocks, and system message sequences to ensure proper segmentation that maintains the logical flow of information.

At operation 508, the OTA log analysis system segments the cleaned log files into chunks based on the chunk size and overlap parameters. In one embodiment, the system creates chunks of consistent size with predetermined overlap between adjacent chunks to maintain context across chunk boundaries, particularly for error patterns that may span multiple chunks. For example, if an error sequence spans the end of one chunk and the beginning of another, the overlap ensures the complete error sequence is captured in at least one chunk. In another embodiment, the system adjusts chunk boundaries to align with natural breaks in the log file structure, such as the completion of error sequences or update phases, while maintaining the specified overlap parameters.

At operation 510, the OTA log analysis system assigns unique identifiers to each chunk. In one embodiment, the system generates identifiers that incorporate information about the chunk's position within the original log file, the log file type, and a timestamp, enabling efficient tracking and retrieval of chunks during subsequent analysis. In another embodiment, the system includes metadata in the identifier about the chunk's content, such as the number of error codes or the presence of specific types of system messages, facilitating targeted analysis of chunks containing particular types of information.

At operation 512, the OTA log analysis system indexes chunks with reference to their original log file location. In one embodiment, the system maintains a mapping between each chunk and its source location in the original log file, enabling traceability and context preservation during analysis. For example, when an error pattern is identified in a chunk, the system can reference the original log file location to examine surrounding context if needed. In another embodiment, the system creates an index structure that includes relationships between chunks, such as overlapping content or sequential relationships, facilitating analysis of error patterns that span multiple chunks.

At operation 514, the OTA log analysis system stores the chunks in memory for subsequent analysis. In one embodiment, the system organizes the chunks in a data structure optimized for parallel processing, with each chunk's content, metadata, and relationships to other chunks readily accessible for both rule-based and AI-powered analysis. In another embodiment, the system implements a caching strategy that prioritizes frequently accessed chunks or chunks containing critical error patterns, improving processing efficiency during analysis.

The method 500 provides an approach to segmenting log files that balances efficient processing with the importance of maintaining contextual relationships within the log data. The combination of configurable chunk parameters and intelligent segmentation based on log file structure enables effective analysis of error patterns across different types of OTA client logs. The method's approach to chunk identification and indexing ensures traceability back to source logs while facilitating parallel processing and efficient access during subsequent analysis steps. This segmentation strategy is particularly useful for processing large log files from different OEM implementations, where maintaining context around error patterns is enables accurate analysis.

Referring to FIG. 6, a flowchart of a method 600 for generating a rule-based error report from log data is shown, illustrating one embodiment for analyzing log chunks using rule-based approaches to identify and document error patterns. The method 600 enables efficient extraction of error codes and associated information through pattern matching and constraint verification.

At operation 602, an OTA log analysis system receives log chunks that have been preprocessed and segmented from cleaned log files. In one embodiment, the log chunks contain portions of log files sized according to predetermined chunk size parameters, with overlap between chunks to maintain context across chunk boundaries. In another embodiment, the log chunks are received with their unique identifiers and index information referencing their original log file location, enabling traceability during analysis.

At operation 604, the OTA log analysis system initializes regex patterns for error code matching. In one embodiment, the system loads predetermined regular expression patterns designed to identify specific error code formats and patterns within the log chunks. For example, patterns may be initialized to match error codes in formats such as "ERR_001" or numerical codes like "0x640a". In another embodiment, the system may initialize context-aware patterns that consider surrounding text and formatting to improve error code identification accuracy.

At operation 606, the OTA log analysis system scans log chunks for error code patterns using regex matching. In one embodiment, the system applies the initialized regex patterns to each log chunk to identify occurrences of error codes, maintaining references to the original log lines where errors are found. In another embodiment, the system may employ parallel processing to scan multiple chunks simultaneously, improving processing efficiency for large log files.

At operation 608, the OTA log analysis system identifies timeout events in log chunks. In one embodiment, the system searches for specific patterns indicating update duration exceeding predetermined thresholds, such as connection timeouts or update process timeouts. In another embodiment, the system analyzes temporal information within log chunks to identify sequences of events suggesting timeout conditions, such as repeated connection attempts or incomplete update processes.

At operation 610, the OTA log analysis system verifies binary file size constraints. In one embodiment, the system compares binary file sizes mentioned in log chunks against available vehicle storage capacity to identify potential size-related failures. For example, if a binary file size exceeds available vehicle storage, this may trigger identification of a size constraint violation. In another embodiment, the system may analyze compression ratios and delta file sizes to ensure they meet specified requirements for OTA updates.

At operation 612, the OTA log analysis system extracts error codes and associated log lines. In one embodiment, the system creates a mapping between identified error codes and their surrounding log context, including timestamps and related system messages. In another embodiment, the system may extract additional metadata such as client version, device specifications, and configuration parameters associated with each error occurrence.

At operation 614, the OTA log analysis system determines error code definitions from an error code database. In one embodiment, the system queries a database containing comprehensive error code definitions, known causes, and potential solutions for each identified error code. In another embodiment, the system may retrieve OEM-specific error definitions and handling guidelines based on the manufacturer information associated with the log chunks.

At operation 616, the OTA log analysis system generates a rule-based error report comprising identified error codes, error definitions, associated log lines, timeout events, and binary size violations. In one embodiment, the report includes detailed information about each error occurrence, including temporal sequence, context information, and potential impact on the OTA update process. In another embodiment, the system may organize the report hierarchically, grouping related errors and highlighting issues that may benefit from more immediate attention.

At operation 618, the OTA log analysis system stores the rule-based error report for hybrid analysis. In one embodiment, the system saves the report in a format compatible with subsequent AI-based analysis, enabling integration of rule-based findings with AI-powered contextual understanding. In another embodiment, the system may include metadata about the rule-based analysis process, such as the patterns used and the confidence levels of matches, to inform the hybrid analysis process.

The method 600 provides efficient identification and documentation of errors through rule-based analysis of log chunks. This approach is particularly valuable for rapid identification of known error patterns and verification of system constraints. The combination of regex pattern matching, timeout detection, and binary size verification enables comprehensive error detection, while the integration with error code databases provides context and definitions for identified issues. The resulting rule-based error report serves as a foundation for hybrid analysis, complementing AI-based approaches with structured identification of known error patterns. This method is especially effective for handling common error scenarios and system constraint violations in OTA update processes across different OEM implementations.

Referring to FIG. 7, a flowchart of a method 700 for analyzing log errors using an AI-engine is shown, illustrating one embodiment for processing and analyzing log chunks using artificial intelligence based approaches. The method 700 enables efficient analysis of error logs from vehicle OTA software updates through AI-powered contextual analysis and error filtering.

At operation 702, an OTA log analysis system receives log chunks that have been preprocessed and segmented from cleaned log files. In one embodiment, the log chunks contain portions of log files sized according to predetermined chunk size parameters, with overlap between chunks to maintain context across chunk boundaries. In another embodiment, the log chunks are received with their unique identifiers and index information referencing their original log file location, enabling traceability during analysis.

At operation 704, the OTA log analysis system counts the number of errors in each log chunk. In one embodiment, the system performs an initial scan of each chunk to identify and enumerate error patterns, including error codes, timeout events, and binary size violations. In another embodiment, the system maintains a running tally of different error types within each chunk, providing statistical information about error distribution and frequency.

At operation 706, the OTA log analysis system extracts error-related log lines from each log chunk. In one embodiment, the system identifies and extracts log lines containing error codes, system messages, and associated contextual information surrounding the error occurrences. In another embodiment, the system may extract additional metadata such as timestamps, device specifications, and configuration parameters associated with each error occurrence.

At operation 708, the OTA log analysis system generates vector embeddings for extracted error-related log lines. In one embodiment, the system uses a large language model to generate vector embeddings that capture the semantic meaning of error messages and their surrounding context. In another embodiment, the system may employ specialized embedding models trained specifically on OTA update logs to better capture domain-specific error patterns and relationships.

Figure 8:
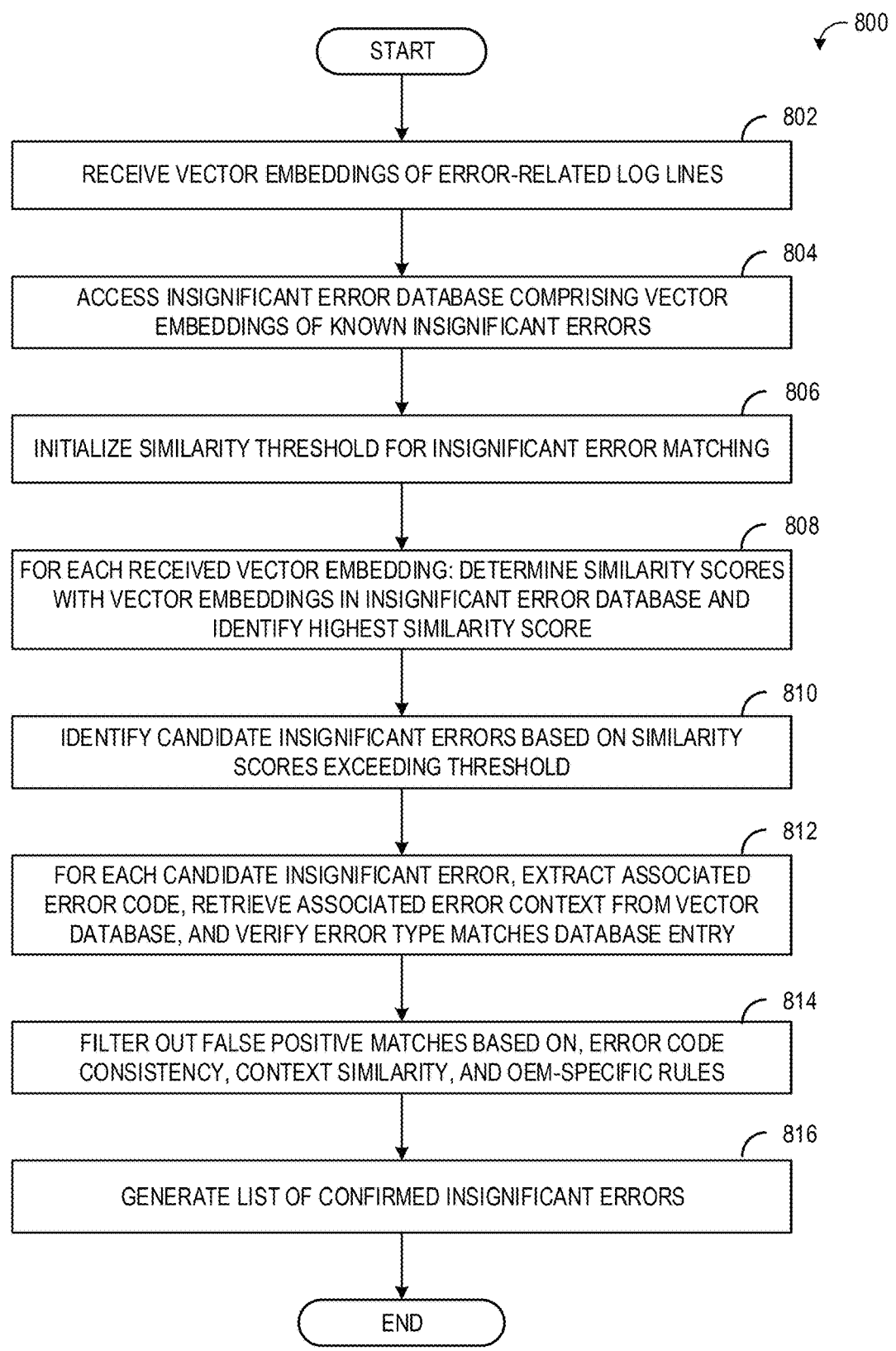
FIG. 8 is a flowchart illustrating a method for identifying insignificant errors using vector embeddings, according to an embodiment of the present disclosure.

At operation 710, the OTA log analysis system compares vector embeddings with an insignificant error database to identify insignificant errors, as detailed in FIG. 8. In one embodiment, the system calculates similarity scores between the generated vector embeddings and known insignificant error embeddings stored in the database. In another embodiment, the system may employ multiple similarity thresholds for different types of errors, allowing for more nuanced filtering based on error categories or OEM-specific requirements.

At operation 712, the OTA log analysis system filters out identified insignificant errors. In one embodiment, the system removes error entries that match known insignificant errors above a predetermined similarity threshold, maintaining only significant errors for further analysis. In another embodiment, the system may preserve metadata about filtered errors for statistical analysis and system improvement purposes.

At operation 714, the OTA log analysis system retrieves error context information from a vector database based on remaining errors, as detailed in FIG. 9. In one embodiment, the system queries the vector database using embeddings of significant errors to retrieve relevant error definitions, known root causes, historical solutions, and OEM-specific information. In another embodiment, the system may retrieve software version dependencies and configuration requirements associated with each error type.

At operation 716, the OTA log analysis system contextualizes remaining errors using retrieved error context information. In one embodiment, the system combines error messages with their associated context information, including OTA client version, device specifications, and manufacturer customizations. In another embodiment, the system may analyze temporal relationships between errors and system events to provide additional context about error occurrence patterns.

At operation 718, the OTA log analysis system generates error summaries and root cause analysis using a large language model based on contextualized errors and OTA client information. In one embodiment, the system provides the large language model with contextualized errors, OTA client information including client version and device specifications, and error definitions and known root causes to generate natural language summaries describing identified error types, potential root causes, and suggested solutions. In another embodiment, the system may customize the prompts provided to the large language model based on OEM-specific requirements or error patterns.

At operation 720, the OTA log analysis system stores error summaries and root cause analysis. In one embodiment, the system saves the analysis results in a format compatible with subsequent review by failure analysis engineers, including references to original log locations and filtered errors. In another embodiment, the system may include metadata about the analysis process, such as similarity scores used for filtering and confidence levels of root cause determinations.

The method 700 provides efficient analysis of OTA client logs through AI-powered processing and filtering. This approach is particularly valuable for identifying and analyzing significant errors while filtering out known insignificant errors, such as those arising from OEM-specific plugins or testing scenarios. The combination of vector embeddings, similarity-based filtering, and large language model analysis enables error analysis that considers both the semantic content of error messages and their broader context within the OTA update process. The method's approach to contextualizing errors and generating natural language summaries enables more efficient review by failure analysis engineers, which may be particularly advantageous given the varying implementations of OTA systems across different OEMs and the frequent introduction of new plugins and customizations that can generate thousands of potential error codes.

Referring to FIG. 8, a flowchart of a method 800 for identifying insignificant errors using vector embeddings is shown, illustrating one embodiment for filtering out known insignificant errors from OTA client logs through vector similarity comparison. The method 800 enables efficient identification and removal of errors that do not require investigation, such as those arising from OEM-specific plugins or testing vehicle scenarios.

At operation 802, an OTA log analysis system receives vector embeddings of error-related log lines that have been generated from extracted error information. In one embodiment, the vector embeddings are generated using a large language model to capture the semantic meaning of error messages and their surrounding context. In another embodiment, the system may employ specialized embedding models trained specifically on OTA update logs to better capture domain-specific error patterns and relationships.

At operation 804, the OTA log analysis system accesses an insignificant error database comprising vector embeddings of known insignificant errors. In one embodiment, the database contains vector embeddings of errors previously classified as insignificant by failure analysis engineers, including errors specific to OEM plugins, testing vehicle scenarios, and known benign system behaviors. In another embodiment, the database includes metadata about each insignificant error, such as the error code, error description, and associated OEM-specific information.

At operation 806, the OTA log analysis system initializes a similarity threshold for insignificant error matching. In one embodiment, the system sets a predetermined threshold value based on experimental validation of error classification accuracy. In another embodiment, the system may employ multiple thresholds for different categories of errors, allowing for more nuanced filtering based on error types or OEM-specific requirements.

At operation 808, the OTA log analysis system determines similarity scores between each received vector embedding and the vector embeddings stored in the insignificant error database. In one embodiment, the system calculates cosine similarity scores between the vector embeddings to measure their semantic similarity. In another embodiment, the system may employ multiple similarity metrics and combine their results to achieve more robust matching.

At operation 810, the OTA log analysis system identifies candidate insignificant errors based on similarity scores exceeding the initialized threshold. In one embodiment, the system selects error messages whose highest similarity score with any insignificant error in the database exceeds the threshold value. In another embodiment, the system may classify an error as a candidate insignificant error responsive to finding multiple high-similarity matches within the database.

At operation 812, the OTA log analysis system processes each candidate insignificant error by extracting its associated error code, retrieving associated error context from a vector database, and verifying that the error type matches the database entry. In one embodiment, the system compares error codes and descriptions to ensure consistency between the candidate error and the matched insignificant error. In another embodiment, the system analyzes surrounding log context to verify that the error occurred under similar circumstances as the known insignificant error.

At operation 814, the OTA log analysis system filters out false positive matches based on error code consistency, context similarity, and OEM-specific rules. In one embodiment, the system applies a set of validation rules that consider the specific OEM implementation, plugin specifications, and testing scenarios to ensure accurate classification of insignificant errors. In another embodiment, the system may employ machine learning models trained on historical error classifications to identify and remove false positive matches.

At operation 816, the OTA log analysis system generates a list of confirmed insignificant errors. In one embodiment, the system creates a report containing the identified insignificant errors along with their matching criteria and validation results. In another embodiment, the system may include metadata about filtered errors for statistical analysis and system improvement purposes.

The method 800 provides efficient identification and filtering of insignificant errors through vector embedding comparison and multi-stage validation. This approach is particularly useful for reducing noise in error analysis by removing known benign errors while maintaining high accuracy through context-aware validation. The combination of semantic similarity matching and rule-based validation ensures reliable identification of insignificant errors across different OEM implementations and testing scenarios. The method's ability to consider OEM-specific rules and context information makes it especially effective for handling the varying implementations of OTA systems across different manufacturers.

Referring to FIG. 9, a flowchart of a method 900 for processing and contextualizing error information is shown, illustrating one embodiment for retrieving and filtering error context information from a vector database. The method 900 enables efficient contextualization of errors identified in OTA client logs by retrieving relevant error context information while filtering out irrelevant information based on client-specific parameters.

At operation 902, an OTA log analysis system receives error information comprising error codes and associated log lines that have been filtered to remove insignificant errors through the process detailed in FIG. 8. In one embodiment, the error information includes significant error codes identified through rule-based analysis and their surrounding log context, including timestamps and related system messages, with insignificant errors having been filtered out based on vector embedding similarity comparison with known insignificant errors. In another embodiment, the error information may include additional metadata such as client version, device specifications, and configuration parameters associated with each significant error occurrence, where the significance of errors has been verified through error code consistency checks and OEM-specific validation rules.

At operation 904, the OTA log analysis system generates vector embeddings for error information. In one embodiment, the system uses a large language model to generate vector embeddings that capture the semantic meaning of error messages and their surrounding context. In another embodiment, the system may employ specialized embedding models trained specifically on OTA update logs to better capture domain-specific error patterns and relationships.

At operation 906, the OTA log analysis system accesses a vector database comprising error context information and associated vector embeddings. In one embodiment, the vector database contains error definitions, known root causes, historical solutions, and OEM-specific information, with each entry having an associated vector embedding. In another embodiment, the database includes software version dependencies and configuration requirements associated with each error type.

At operation 908, the OTA log analysis system determines similarity scores between error vector embeddings and error context vector embeddings. In one embodiment, the system calculates cosine similarity scores between the vector embeddings to measure their semantic similarity. In another embodiment, the system may employ multiple similarity metrics and combine their results to achieve more robust matching of error contexts.

At operation 910, the OTA log analysis system identifies error context information with similarity scores exceeding a threshold. In one embodiment, the system selects error context entries whose similarity scores with the error information exceed a predetermined threshold value. In another embodiment, the system may employ multiple thresholds for different categories of errors, allowing for more nuanced selection based on error types or OEM-specific requirements.

At operation 912, the OTA log analysis system retrieves identified error context information including error definitions, known root causes, historical solutions, OEM-specific information, and software version dependencies. In one embodiment, the system retrieves context information for each error, including detailed descriptions of error causes and potential solutions based on historical data. In another embodiment, the system may retrieve OEM-specific handling guidelines and configuration requirements associated with each error type.

At operation 914, the OTA log analysis system filters out irrelevant error context information based on OTA client version, device specifications, OEM customizations, and testing status. In one embodiment, the system applies filtering rules that consider the specific OEM implementation, client version compatibility, and device specifications to ensure retrieved context information is applicable to the current error scenario. For example, if the OTA client version is 2.1.0 and an error context relates to a feature introduced in version 3.0.0, the system filters out this context as irrelevant. Similarly, if error context information references storage requirements of 2 GB while the device specifications indicate available storage of only 512 MB, the system removes this context as inapplicable. In another embodiment, the system may employ machine learning models trained on historical error resolutions to identify and remove irrelevant context information. For example, the system may analyze patterns in successful error resolutions across different OEM implementations to identify which error contexts are relevant for specific combinations of client versions and device configurations. The system may also consider the testing status of the vehicle, filtering out error contexts that only apply to production vehicles when analyzing logs from testing vehicles, or vice versa. Additionally, the system may evaluate OEM-specific customizations, such as proprietary plugins or modified update protocols, to ensure that error context information aligns with the specific implementation details of the current OEM.

At operation 916, the OTA log analysis system stores relevant error context information for subsequent analysis. In one embodiment, the system saves the filtered context information in a format compatible with subsequent processing steps, including references to original error locations and filtered context entries. In another embodiment, the system may include metadata about the contextualization process, such as similarity scores used for matching and confidence levels of context relevance.

The method 900 enables efficient retrieval and filtering of error context information through vector embedding comparison and multi-stage filtering. This approach is particularly valuable for ensuring that error analysis is informed by relevant historical solutions and OEM-specific information while filtering out irrelevant context that may not apply to the current error scenario. The combination of semantic similarity matching and client-specific filtering ensures reliable contextualization of errors across different OEM implementations and testing scenarios. The method's ability to consider OEM-specific requirements and client configurations makes it especially effective for handling the varying implementations of OTA systems across different manufacturers and the frequent introduction of new plugins and customizations that can generate thousands of potential error codes.

Referring to FIG. 10, a flowchart of a method 1000 for processing FAE feedback and updating error databases is shown, illustrating one embodiment for incorporating failure analysis engineer feedback to improve error classification and context understanding. The method 1000 enables continuous improvement of error analysis through expert feedback integration and database updates.

At operation 1002, an OTA log analysis system receives FAE feedback on analysis results via an FAE review interface. In one embodiment, the interface allows FAEs to review both rule-based and AI-based analysis results and provide feedback on error classifications, particularly for plugin errors, testing vehicle errors, or customization errors. In another embodiment, the interface enables FAEs to document new error patterns related to OEM customizations or testing scenarios, including specific information about plugin specifications, testing batch information, and associated error patterns.

At operation 1004, the OTA log analysis system identifies the type of feedback as either a plugin error, testing vehicle error, or customization error. In one embodiment, the system categorizes the feedback based on pre-determined criteria and metadata associated with the error, such as the presence of plugin-specific identifiers or testing batch numbers. In another embodiment, the system may employ natural language processing to analyze the FAE's feedback description and automatically classify the error type.

At operation 1006, for plugin errors, the OTA log analysis system extracts plugin specifications and error codes from the FAE feedback. In one embodiment, the system parses the feedback to identify specific plugin identifiers, version information, and associated error codes that occur during plugin operation. In another embodiment, the system may extract additional metadata about the plugin's implementation and its interaction with the OTA system.

At operation 1008, for testing vehicle errors, the OTA log analysis system extracts testing batch information and associated error patterns. In one embodiment, the system identifies testing batch numbers, test case identifiers, and specific error patterns that occur during vehicle testing scenarios. In another embodiment, the system may extract temporal relationships between errors and testing phases to better understand the context of testing-related issues.

At operation 1010, for customization errors, the OTA log analysis system extracts OEM-specific customization details and error behaviors. In one embodiment, the system identifies manufacturer-specific implementations, custom configurations, and associated error patterns that occur due to OEM customizations. In another embodiment, the system may extract information about the interaction between customizations and standard OTA functionality.

At operation 1012, the OTA log analysis system generates vector embeddings for the extracted error information. In one embodiment, the system uses a large language model to generate vector embeddings that capture the semantic meaning of error descriptions and their surrounding context. In another embodiment, the system may employ specialized embedding models trained specifically on OTA update logs to better capture domain-specific error patterns and relationships.

At operation 1014, the OTA log analysis system determines if the error should be added to the insignificant error database based on frequency of occurrence and FAE classification. In one embodiment, the system analyzes the frequency of similar errors across multiple OTA client logs and compares it against predetermined thresholds. In another embodiment, the system may consider the FAE's explicit classification of the error as significant or insignificant, along with supporting rationale.

At operation 1016, if the error is classified as insignificant, the OTA log analysis system updates the insignificant error database with error vector embeddings and associated metadata. In one embodiment, the system adds the generated vector embeddings along with contextual information such as plugin specifications, testing batch information, or OEM customization details. In another embodiment, the system may update existing entries in the database with additional context or modify similarity thresholds based on the new information.

At operation 1018, if the error is classified as significant, the OTA log analysis system updates the vector database with new error context information and associated vector embeddings. In one embodiment, the system adds the error context information including error definitions, known root causes, and potential solutions, along with the generated vector embeddings. In another embodiment, the system may update existing entries with additional context or create new relationships between related error patterns.

At operation 1020, the OTA log analysis system stores the updated databases for subsequent analysis. In one embodiment, the system maintains version control of the databases to track changes and enable rollback if needed. In another embodiment, the system may generate analytics about database updates to monitor the evolution of error classifications and context information over time.

The method 1000 provides a systematic approach to incorporating expert feedback into the error analysis system, enabling continuous improvement in error classification and context understanding. This feedback loop is particularly valuable for handling the varying implementations of OTA systems across different OEMs and the frequent introduction of new plugins and customizations that can generate thousands of potential error codes. The method's ability to distinguish between plugin errors, testing vehicle errors, and customization errors, while maintaining separate databases for insignificant errors and error context information, ensures that the system can effectively filter out known benign errors while maintaining comprehensive context for significant issues. This adaptive capability ensures the system remains effective even as OEM implementations evolve and new error patterns emerge.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

The invention claimed is:

1. A method of analyzing over-the-air (OTA) client logs from vehicles, comprising:

receiving OTA client log files comprising error logs generated during OTA software updates of vehicles;

preprocessing the OTA client log files to generate cleaned log files by removing duplicated log lines and standardizing log file formats;

segmenting the cleaned log files into log chunks based on chunk size parameters;

analyzing the log chunks using a rule engine to extract predefined error codes;

analyzing the log chunks using an artificial intelligence (AI) engine by:

generating vector embeddings for error-related log lines;

comparing the vector embeddings with an insignificant error database to identify and filter out insignificant errors;

retrieving error context information from a vector database based on remaining errors; and generating error summaries and root cause analysis using a large language model based on the remaining errors, the error context information, and OTA client information; and displaying analysis results comprising rule-based error codes and AI-based root cause analysis via a failure analysis engineer (FAE) review interface.

2. The method of claim 1, wherein preprocessing the OTA client log files comprises:

identifying timestamps in the OTA client log files;

trimming the timestamps to a standardized format;

identifying file paths in the OTA client log files; and trimming the file paths to retain file names.

3. The method of claim 1, wherein segmenting the cleaned log files into log chunks comprises:

setting chunk size and overlap parameters based on log file type;

identifying log file boundaries and structure;

assigning unique identifiers to each chunk; and indexing chunks with reference to original log file location.

4. The method of claim 1, wherein analyzing the log chunks using the rule engine comprises:

initializing regex patterns for error code matching;

scanning log chunks for error code patterns using regex matching;

identifying timeout events in log chunks;

verifying binary file size constraints; and generating a rule-based error report comprising identified error codes, error definitions, associated log lines, timeout events, and binary size violations.

5. The method of claim 1, wherein comparing the vector embeddings with the insignificant error database comprises:

accessing the insignificant error database comprising vector embeddings of known insignificant errors;

initializing a similarity threshold for insignificant error matching;

determining similarity scores between received vector embeddings and vector embeddings in the insignificant error database;

identifying candidate insignificant errors based on similarity scores exceeding the similarity threshold; and filtering out false positive matches based on error code consistency, context similarity, and original equipment manufacturer-specific rules.

6. The method of claim 1, wherein retrieving error context information from the vector database comprises:

determining similarity scores between error vector embeddings and error context vector embeddings;

identifying error context information with similarity scores exceeding a threshold;

retrieving identified error context information including error definitions, known root causes, historical solutions, original equipment manufacturer-specific information, and software version dependencies; and filtering out irrelevant error context information based on OTA client version, device specifications, original equipment manufacturer customizations, and testing status.

7. The method of claim 1, further comprising:

receiving FAE feedback on the analysis results via the FAE review interface;

identifying type of feedback as plugin error, testing vehicle error, or customization error;

generating vector embeddings for extracted error information from the FAE feedback;

determining if the error should be added to the insignificant error database based on frequency of occurrence and FAE classification; and updating one or more of the insignificant error database and the vector database based on the FAE feedback.

8. The method of claim 1, wherein the OTA client log files include information comprising:

client version;

device identifier;

model name;

manufacturer name; and configuration parameters.

9. A system for analyzing over-the-air (OTA) client logs from vehicles, comprising:

at least one processor; and non-transitory memory storing instructions that, when executed by the at least one processor, cause the at least one processor to perform operations comprising:

receiving OTA client log files comprising error logs generated during OTA software updates of vehicles;

preprocessing the OTA client log files to generate cleaned log files by removing duplicated log lines and standardizing log file formats;

segmenting the cleaned log files into log chunks based on chunk size parameters;

analyzing the log chunks using a rule engine to extract predefined error codes;

analyzing the log chunks using an artificial intelligence (AI) engine by:

generating vector embeddings for error-related log lines;

comparing the vector embeddings with an insignificant error database to identify and filter out insignificant errors;

retrieving error context information from a vector database based on remaining errors; and generating error summaries and root cause analysis using a large language model based on the remaining errors, the error context information, and OTA client information; and displaying analysis results comprising rule-based error codes and AI-based root cause analysis via a failure analysis engineer (FAE) review interface.

10. The system of claim 9, wherein the non-transitory memory further stores:

the insignificant error database comprising vector embeddings of known insignificant errors and associated metadata;

the vector database comprising error context information including error definitions, known root causes, historical solutions, and software version dependencies; and a web-based interface configured to:

receive OTA client log file uploads;

display log analysis results comprising rule-based error codes and AI-based root cause analysis; and capture feedback from failure analysis engineers for updating one or more of the insignificant error database and the vector database.

11. The system of claim 10, wherein comparing the vector embeddings with the insignificant error database to identify and filter out insignificant errors comprises:

accessing the insignificant error database comprising vector embeddings of known insignificant errors;

initializing a similarity threshold for insignificant error matching;

determining similarity scores between received vector embeddings and vector embeddings in the insignificant error database;

identifying candidate insignificant errors based on similarity scores exceeding the similarity threshold;

extracting associated error codes and error context for each candidate insignificant error; and filtering out false positive matches based on error code consistency, context similarity, and original equipment manufacturer-specific rules.

12. The system of claim 10, wherein retrieving error context information from the vector database based on remaining errors comprises:

determining similarity scores between error vector embeddings and error context vector embeddings stored in the vector database;

identifying error context information with similarity scores exceeding a context similarity threshold;

retrieving identified error context information including error definitions, known root causes, historical solutions, original equipment manufacturer-specific information, and software version dependencies; and filtering out irrelevant error context information based on OTA client version, device specifications, original equipment manufacturer customizations, and testing status.

13. The system of claim 9, wherein generating error summaries and root cause analysis using the large language model comprises:

providing the large language model with:

contextualized errors from the vector database;

OTA client information including client version, device specifications, and original equipment manufacturer customizations;

error definitions and known root causes; and generating a natural language summary describing:

identified error types;

potential root causes based on error context; and suggested solutions based on historical resolution data.

14. A method of analyzing over-the-air (OTA) client logs from vehicles, comprising:

receiving OTA client log files comprising error logs generated during OTA software updates of vehicles and associated OTA client information;

preprocessing the OTA client log files to generate cleaned log files;

accessing predetermined chunk size parameters and overlap parameters from a configuration database based on a log file type of the cleaned log files;

segmenting the cleaned log files into log chunks based on the accessed chunk size parameters and overlap parameters, wherein each log chunk is assigned a unique identifier and indexed with reference to its original log file location;

analyzing each log chunk using a rule engine to extract predefined error codes;

for each log chunk, analyzing error-related log lines using an artificial intelligence (AI) engine by:

generating vector embeddings for extracted error-related log lines;

comparing the vector embeddings with an insignificant error database to identify and filter out insignificant errors;

retrieving error context information from a vector database based on remaining errors after filtering out the insignificant errors; and filtering the retrieved error context information based on the associated OTA client information;

aggregating filtered error context information from analyzed log chunks;

generating error summaries and root cause analysis using a large language model based on the aggregated filtered error context information, the associated OTA client information, and error patterns identified across multiple log chunks;

displaying analysis results via a failure analysis engineer (FAE) review interface; and updating one or more of the insignificant error database and the vector database based on FAE feedback received via the FAE review interface.

15. The method of claim 14, wherein analyzing each log chunk using the rule engine comprises:

scanning the log chunk using regex pattern matching to identify error code patterns;

identifying timeout events in the log chunk; and verifying binary file size constraints.

16. The method of claim 14, wherein OTA client information comprises client version, device identifier, model name, manufacturer name, and configuration parameters.

17. The method of claim 16, wherein filtering the error context information comprises:

comparing the client version from the associated OTA client information with version dependencies in the error context information;

comparing device specifications from the associated OTA client information with device-specific error context information; and filtering out error context information not matching the manufacturer name from the associated OTA client information.

18. The method of claim 14, wherein updating one or more of the insignificant error database and the vector database based on FAE feedback received via the FAE review interface comprises:

identifying a type of the FAE feedback as a plugin error;

extracting plugin specifications and associated error codes from the FAE feedback;

generating vector embeddings for the extracted plugin specifications and error codes;

determining if the plugin error should be added to the insignificant error database based on:

calculating a frequency of occurrence of the plugin error across multiple OTA client logs;

comparing the calculated frequency against a predetermined frequency threshold;

analyzing FAE classification of the plugin error as significant or insignificant; and verifying the plugin error is specific to a particular plugin implementation; and updating the insignificant error database with the generated vector embeddings and associated metadata when the plugin error is determined to be insignificant based on exceeding the predetermined frequency threshold, being classified as insignificant by the FAE, and being verified as plugin-specific.

19. The method of claim 14, wherein updating one or more of the insignificant error database and the vector database based on FAE feedback received via the FAE review interface comprises:

identifying a type of the FAE feedback as a testing vehicle error;

extracting testing batch information and associated error patterns from the FAE feedback;

generating vector embeddings for the extracted testing batch information and error patterns;

determining if the testing vehicle error should be added to the insignificant error database based on:

identifying whether the error patterns are specific to testing vehicles by comparing against known testing vehicle error signatures;

verifying the error patterns occur predominantly during testing phases; and confirming the error patterns are not present in production vehicle logs; and updating the vector database with the generated vector embeddings and new error context information when the error patterns are determined to be significant based on appearing in production vehicle logs.

20. The method of claim 14, wherein updating one or more of the insignificant error database and the vector database based on FAE feedback received via the FAE review interface comprises:

identifying a type of the FAE feedback as a customization error;

extracting original equipment manufacturer-specific customization details and error behaviors from the FAE feedback;

generating vector embeddings for the extracted customization details and error behaviors;

determining if the customization error should be added to the insignificant error database based on:

a determination of whether the error behaviors are specific to particular original equipment manufacturer customizations by comparing against a predetermined set of OTA client implementations;

evaluating impact of the error behaviors on OTA functionality;

reviewing historical occurrences of similar customization errors; and determining FAE classification of a customization error severity; and updating one or more of:

the insignificant error database with the generated vector embeddings when the customization error is determined to be insignificant based on being specific to customizations and not impacting OTA functionality; and the vector database with new error context information and the generated vector embeddings when the customization error is determined to be significant based on impacting OTA functionality or affecting multiple original equipment manufacturer implementations.

\* \* \* \* \*